(12) United States Patent
Imaoka et al.

(10) Patent No.: US 8,052,283 B2
(45) Date of Patent: Nov. 8, 2011

(54) OBLIQUE PROJECTION OPTICAL SYSTEM

(75) Inventors: Masayuki Imaoka, Izumiotsu (JP); Keiko Yamada, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 539 days.

(21) Appl. No.: 12/341,239

(22) Filed: Dec. 22, 2008

(65) Prior Publication Data

US 2009/0168031 A1    Jul. 2, 2009

(30) Foreign Application Priority Data

Dec. 27, 2007  (JP) ................. 2007-337261

(51) Int. Cl.
G03B 21/22  (2006.01)
G02B 17/00  (2006.01)
(52) U.S. Cl. ............ 353/78; 359/727; 359/729
(58) Field of Classification Search .......... 353/38, 353/78, 97, 98, 99, 102; 359/366, 534, 639, 359/668, 727–736
See application file for complete search history.

(56) References Cited

U.S. PATENT DOCUMENTS

| 5,956,192 | A | * | 9/1999 | Williamson | 359/859 |
| 6,626,541 | B2 | | 9/2003 | Sunaga | 353/69 |
| 6,951,395 | B2 | | 10/2005 | Chatani et al. | 353/99 |
| 6,994,442 | B2 | * | 2/2006 | Kurematsu et al. | 359/859 |
| 7,048,388 | B2 | | 5/2006 | Takaura et al. | 353/99 |
| 2001/0048558 | A1 | | 12/2001 | Lin | 359/555 |
| 2007/0184368 | A1 | | 8/2007 | Nishikawa et al. | 430/30 |

FOREIGN PATENT DOCUMENTS

JP    2002-174853 A    6/2002

* cited by examiner

*Primary Examiner* — Georgia Y Epps
*Assistant Examiner* — Don Williams
(74) *Attorney, Agent, or Firm* — Sidley Austin LLP

(57) ABSTRACT

An oblique projection optical system enlarges an image formed on a display device surface, and obliquely projects the enlarged image on a screen surface. The oblique projection optical system has, in the order from a reduction side: a refraction optical portion having a positive optical power, a concave reflection surface having a positive optical power, and a convex reflection surface having a negative optical power. The refraction optical portion includes a rotationally symmetric coaxial refraction group. An intermediate image of the image formed on the display device surface is formed between the refraction optical portion and the concave reflection surface. An aperture stop image is formed between the concave reflection surface and the convex reflection surface. The concave reflection surface and the convex reflection surface fulfill prescribed conditional formulae.

20 Claims, 9 Drawing Sheets

OBLIQUE PROJECTION OPTICAL SYSTEM

This application is based on Japanese Patent Application No. 2007-337261 filed on Dec. 27, 2007, the contents of which are hereby incorporated by reference.

BACKGROUND OF THE INVENTION

1. Field of the Invention

The present invention relates to an oblique projection optical system, for example, to an oblique projection optical system that is incorporated in an image projection apparatus, which has a display device such as a digital micromirror device and a liquid crystal display device, enlarges an image formed on a display device surface and obliquely projects it on a screen surface.

2. Description of Related Art

In recent years, the demand for wide-angle projection in a projector is increasing. And not only in use of rear projection but also in use of front projection, wide-angle projectors that use mirrors in a projection optical system have been developed one after another. Using mirrors in a projection optical system makes it possible to achieve wide-angle projection that has been impossible with only a refraction lens. Accordingly, various types of projection optical systems that include mirrors have been proposed. For example, the Patent Document 1 proposes an oblique projection optical system that has a refraction lens, a concave mirror, and a convex mirror.

Patent Document 1: US2007/184368A1

In a case of a projection optical system for front projection, not only a simple focus mechanism is required but also more compactness of the projection optical system is required compared with that for rear projection. However, in the oblique projection optical system described in the Patent Document 1, because the convex mirror's optical power is weak, the mirror size is large. Besides, because the rotationally symmetric coaxial refraction lens group is relatively long, the lens diameter on the enlargement side is large. Accordingly, it is difficult to achieve compactness of the projection optical system. Besides, in the oblique projection optical system described in the Patent Document 1, because the distance between the concave mirror and the convex mirror is short, aberration correction is inefficient. In addition, because there are only two reflection surfaces that are disposed as optical surfaces in the vicinity of and after the intermediate image, the burden of aberration correction on the reflection surfaces is heavy, and it is concerned that error sensitivity and size would increase.

SUMMARY OF THE INVENTION

Under the background described above, it is an object of the present invention to provide an oblique projection optical system that allows super-wide angle projection keeping high both performance and compactness, and to provide an image projection apparatus that uses the oblique projection optical system.

To achieve the above object, according to one aspect of the invention, an oblique projection optical system that enlarges an image formed on a display device surface, and obliquely projects the enlarged image on a screen surface, includes: in the order from a reduction side, a refraction optical portion having a positive optical power; a concave reflection surface having a positive optical power; and a convex reflection surface having a negative optical power. The refraction optical portion includes a rotationally symmetric coaxial refraction group, an intermediate image of the image formed on the display device surface is formed between the refraction optical portion and the concave reflection surface, an aperture stop image is formed between the concave reflection surface and the convex reflection surface, and conditional formulae (1) and (2) below are fulfilled:

$$0.3 < L2/L1 < 1 \quad (1),$$

$$0.2 < |f1/f2| < 1 \quad (2),$$

where, when a principal ray that is emitted from the image center on the display device surface and reaches the image center on the screen surface is called a central principal ray, L1 represents a distance that is in the normal direction of the display device surface and extends from the image center on the display device surface from which the central principal ray is emitted to a point where the central principal ray hits the concave reflection surface;

L2 represents a distance that is in the normal direction of the screen surface and extends from a point where the central principal ray hits the concave reflection surface to a point where the central principal ray hits the convex reflection surface;

f1 represents a focal length of the concave reflection surface at the point where the central principal ray hits the concave reflection surface; and f2 represents a focal length of the convex reflection surface at the point where the central principal ray hits the convex reflection surface.

According to another aspect of the invention, an image projection apparatus includes: a display device which forms a 2-dimensional image; and an oblique projection optical system which enlarges the 2-dimensional image formed by the display device and projects the enlarged image on a screen surface. The oblique projection optical system includes: in the order from a reduction side, a refraction optical portion having a positive optical power; a concave reflection surface having a positive optical power; and a convex reflection surface having a negative optical power. The refraction optical portion includes a rotationally symmetric coaxial refraction group, an intermediate image of the 2-dimensional image is formed between the refraction optical portion and the concave reflection surface, an aperture stop image is formed between the concave reflection surface and the convex reflection surface, and conditional formulae (1) and (2) below are fulfilled:

$$0.3 < L2/L1 < 1 \quad (1),$$

$$0.2 < |f1/f2| < 1 \quad (2),$$

where, when a principal ray that is emitted from the image center on the display device surface and reaches the image center on the screen surface is called a central principal ray, L1 represents a distance that is in the normal direction of the display device surface and extends from the image center on the display device surface from which the central principal ray is emitted to a point where the central principal ray hits the concave reflection surface;

L2 represents a distance that is in the normal direction of the screen surface and extends from a point where the central principal ray hits the concave reflection surface to a point where the central principal ray hits the convex reflection surface;

f1 represents a focal length of the concave reflection surface at the point where the central principal ray hits the concave reflection surface; and f2 represents a focal length of the convex reflection surface at the point where the central principal ray hits the convex reflection surface.

DETAILED DESCRIPTION OF THE PREFERRED EMBODIMENTS

Hereinafter, embodiments and the like of an oblique projection optical system according to the present invention are explained with reference the drawings. An oblique projection optical system according to the present invention enlarges an image formed on the display device surface and obliquely projects the enlarged image on a screen surface so that the central principal ray (i.e., the principal ray which is emitted from the image center on the display device surface and reaches the image center on the screen surface) obliquely hits the screen surface. Various types of oblique projection optical system can be expected as embodiments. Here, two types of oblique projection optical system are used as examples, and distinctive optical constructions of the oblique projection optical systems are explained.

Figure 1:
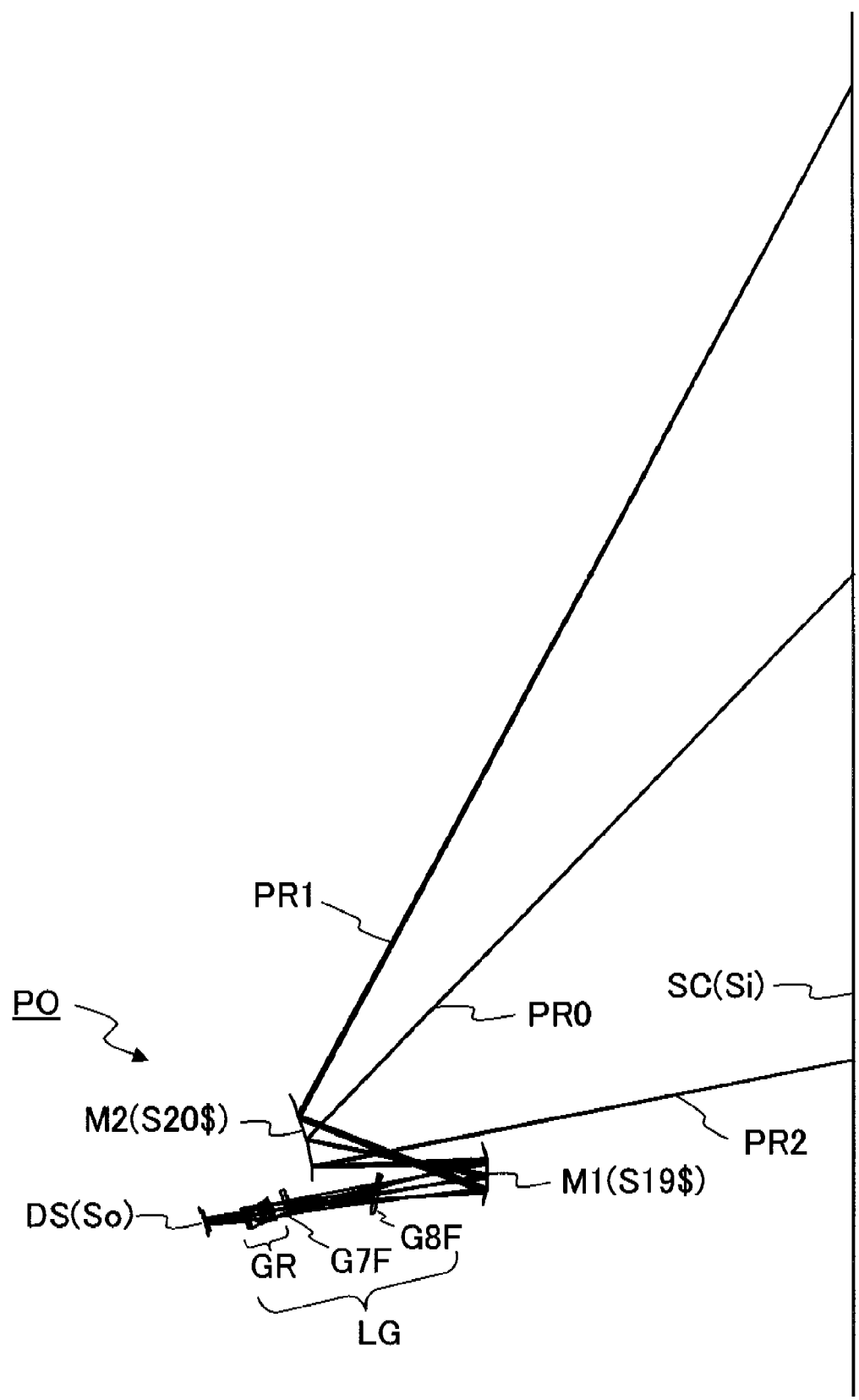
FIG. 1 is an optical path diagram showing an optical configuration from a display device to a screen of an oblique projection optical system (Example 1) of a type 1.
Figure 2:
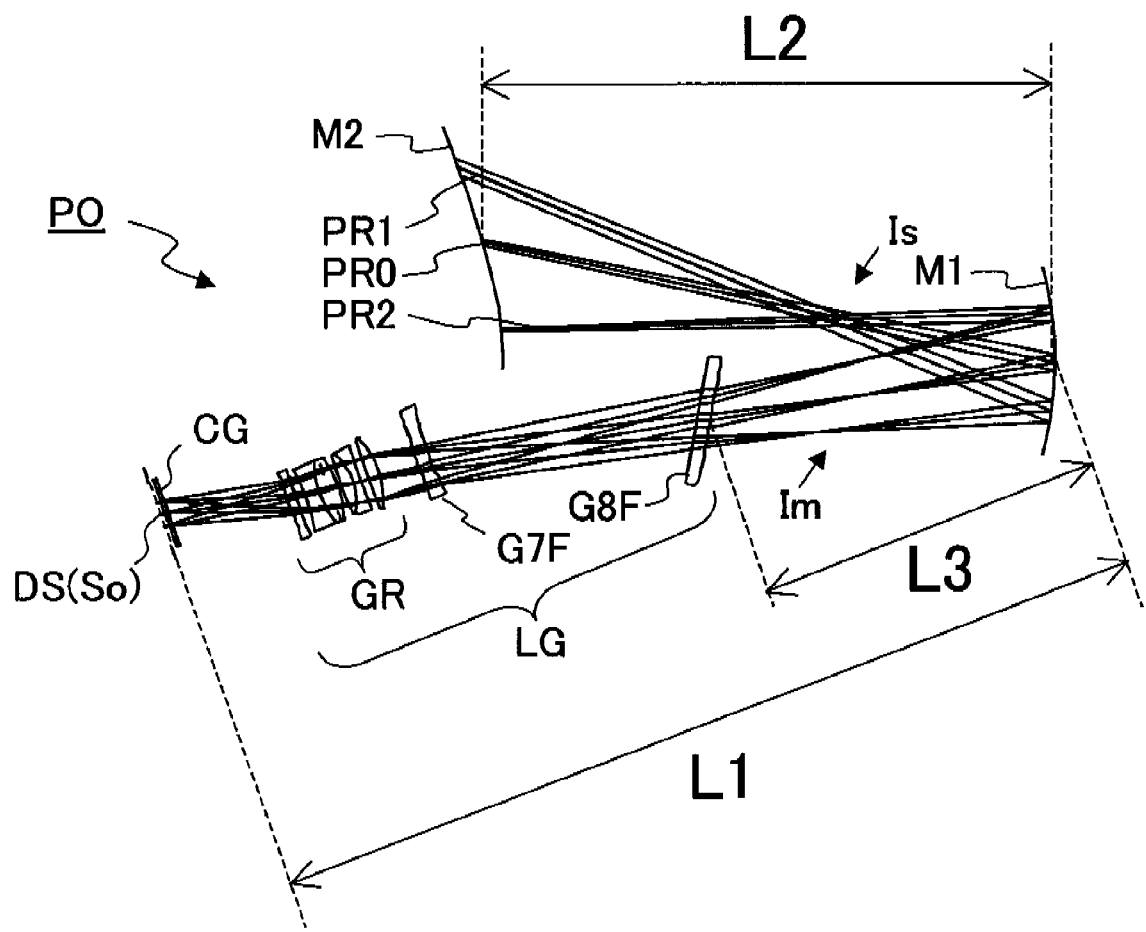
FIG. 2 is an optical path diagram showing an optical configuration from the display device to a convex mirror of the oblique projection optical system (Example 1) of the type 1.
Figure 3:
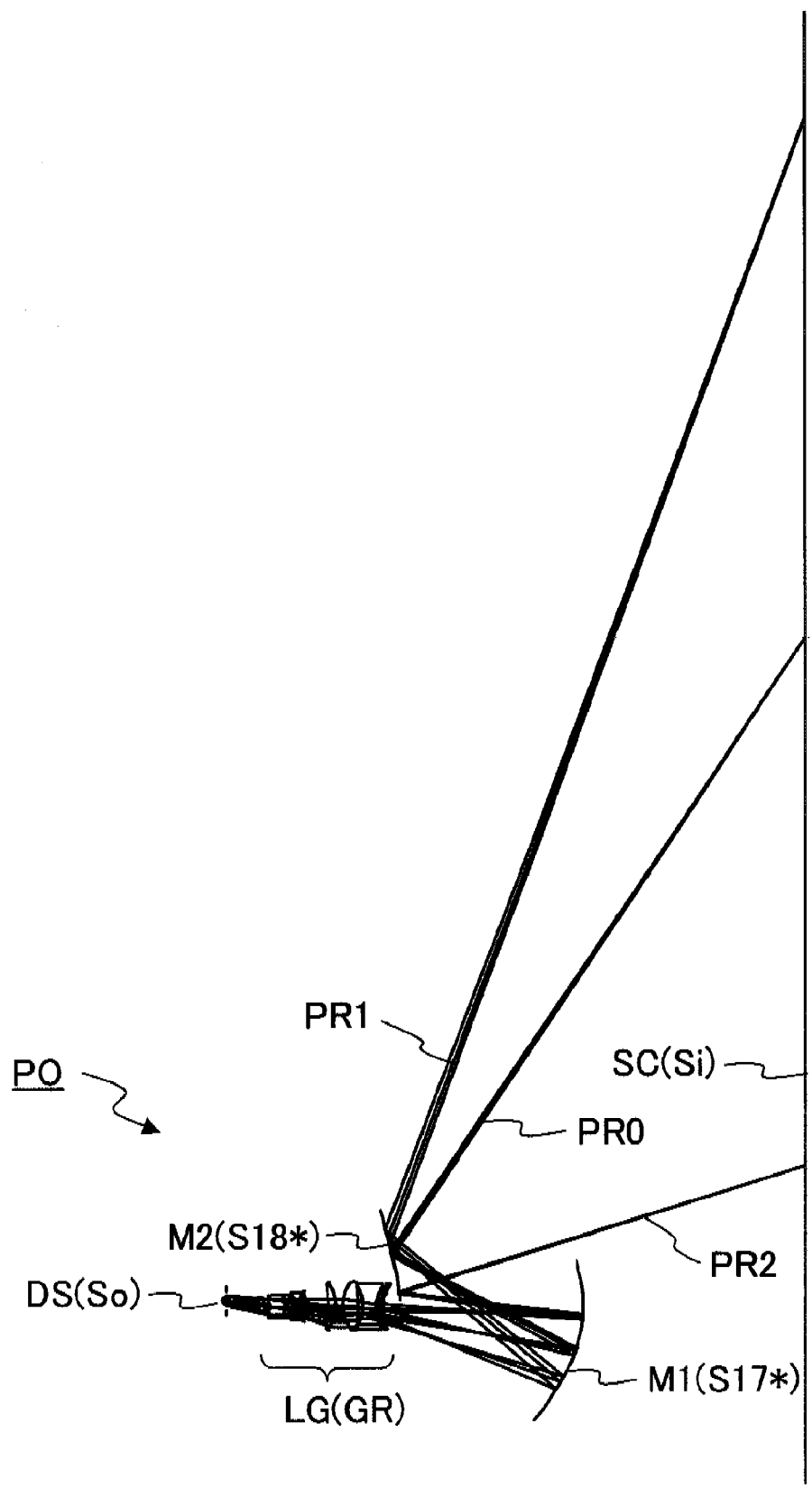
FIG. 3 is an optical path diagram showing an optical configuration from a display device to a screen of an oblique projection optical system (Example 2) of a type 2.

An oblique projection optical system of the type 1 is composed of a non-axial system that uses a plurality of rotationally asymmetric aspherical surfaces (what is called a free curved surface), and an oblique projection optical system of the type 2 is composed of a coaxial system that includes only a spherical surface and a rotationally symmetric aspherical surface. In FIGS. 1 and 3, optical constructions (optical arrangement, projection optical path and the like) of the entire projection optical path that extends from a display device DS to a screen SC in the oblique projection optical systems PO of the types 1 and 2 are each shown in optical section (image-surface short-edge side section) when seen along the image-surface long-edge direction of a display device surface So. Besides, in FIGS. 2 and 4, essential portions (from the display device DS to a convex mirror M2) in FIGS. 1 and 3 are enlarged and their optical constructions (optical arrangement, projection optical path and the like) are each shown in optical section (image-surface short-edge side section) when seen along the image-surface long-edge direction of the display device surface So. In other words, in a rectangular coordinate system (x, y, z) that has the normal direction of the display device surface So as the x direction, the image-surface short-edge direction of the display device surface So as the y direction, and the image-surface long-edge direction of the display device surface So as the z direction, FIGS. 1 to 4 show the oblique projection optical systems PO of the types 1 and 2 in xy section.

The display device surface So corresponds to an image formation surface of the display device DS that forms a 2-dimensional image by light intensity modulation and the like, and the screen surface Si corresponds to an image projected surface. In the oblique projection optical systems PO of the types 1 and 2, a digital micromirror device is expected as the display device DS. However, it is not limited to this display device, and another non-light emission reflection (or transmission) type of display device (e.g., liquid crystal display device) that is suitable for the oblique projection optical system may be used. In a case where a digital micromirror device is used as the display device, if the display device surface So is illuminated by an illumination optical system (not shown), light that hits the display device surface So is reflected by each micromirror being in the ON/OFF state (e.g., a tilted state of ±12°) and is modulated spatially. At this time, only light reflected by a micromirror that is in the ON state enters the oblique projection optical system PO and is projected onto the screen surface Si. In the oblique projection optical system PO of the type 1, a cover glass CG (FIG. 2) for the display device DS is located in the vicinity of the display device surface So.

Figure 4:
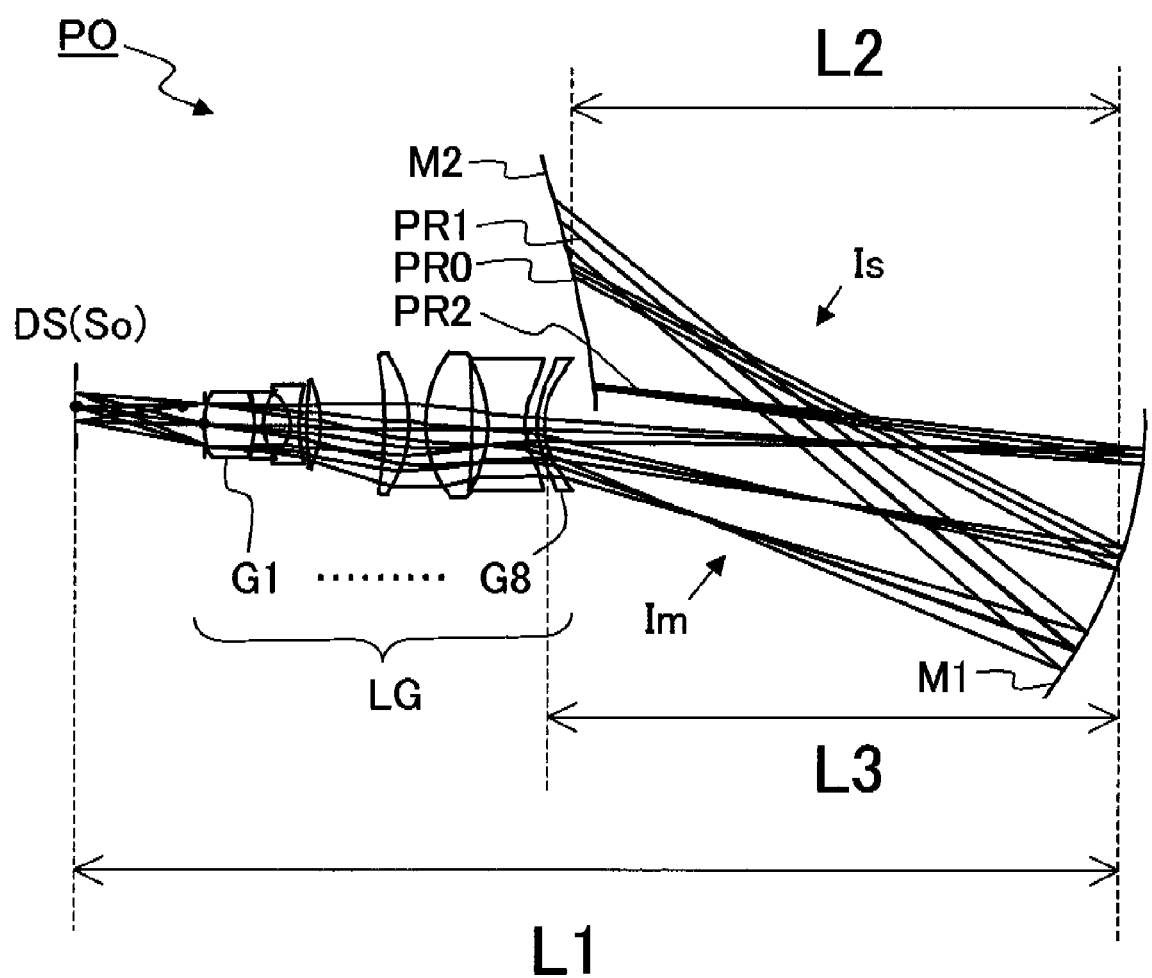
FIG. 4 is an optical path diagram showing an optical configuration from a display device to a convex mirror of the oblique projection optical system (Example 2) of the type 2.

The oblique projection optical systems PO of the types 1 and 2 are each composed of two portions, that is, a refraction optical portion LG having a plurality of refraction surfaces, and a reflection optical portion having two mirrors M1, M2. The oblique projection optical system of the type 1 has the following optical elements from the reduction side in the order of: a refraction optical portion LG having a positive optical power, a concave mirror M1 having a positive optical power, and a convex mirror M2 having a negative optical power. The refraction optical portion LG includes a rotationally symmetric coaxial refraction group GR. The concave mirror M1 has a concave reflection surface (a free curved surface S19$). And the convex mirror M2 has a convex reflection surface (a free curved surface S20$). The oblique projection optical system of the type 2 has the following optical elements from the reduction side in the order of: a refraction optical portion LG having a positive optical power, a concave mirror M1 having a positive optical power, and a convex mirror M2 having a negative optical power. The refraction optical portion LG includes a rotationally symmetric coaxial refraction group GR. The concave mirror M1 has a concave reflection surface (a rotationally symmetric aspherical surface S17*). And the convex mirror M2 has a convex reflection surface (a rotationally symmetric aspherical surface S18*). As shown in FIGS. 2 and 4, the oblique projection optical systems PO of the types 1 and 2 are so structured that an intermediate image Im of an image that is formed by the display device DS is formed between the refraction optical portion LG and the concave mirror M1, and an aperture stop image Is is formed between the concave mirror M1 and the convex mirror M2.

According to the constructions of the oblique projection optical systems PO of the types 1 and 2 in which an intermediate image is formed between the refraction optical portion and the concave reflection surface, then the intermediate image is formed on a screen surface by the concave reflection surface and the convex reflection surface, aberration is given to the intermediate image to cancel distortion that appears on the curved reflection surface which is located closer to the screen surface than the intermediate image, thereby good optical performance can be obtained on the screen surface despite the wide-angle oblique projection optical system. Besides, because the size of the curved reflection surface can be reduced by forming the intermediate image, there is an advantage that fabrication of the curved reflection surface becomes easy.

As in the oblique projection optical systems PO of the types 1 and 2, in the oblique projection optical system that is composed of a refraction system and a reflection system, to carry out super-wide angle projection while balancing well aberration performance and optical system size with each other and keeping both high performance and compactness, it is important how the reflection surface and the refraction surface are arranged relatively with each other, and how the optical power is set. From this point of view, in the oblique projection optical system that has the following optical elements from the reduction side in the order of: a positive-power refraction optical portion that includes a rotationally symmetric coaxial refraction group; a positive-power concave reflection surface; a negative-power convex reflection surface; wherein an intermediate image of the image formed on the display device surface is formed between the refraction optical portion and the concave reflection surface, an aperture stop image is formed between the concave reflection surface and the convex reflection surface, it is preferable that the optical power of the concave reflection surface and the convex reflection surface, and the distance between the concave reflection surface and the convex reflection surface fulfill given conditions. Hereinafter, preferable conditions to well balance the aberration performance and the size with each other, preferable conditions to achieve better performance and size reduction and the like, and other distinctive constructions are explained.

It is preferable that conditional formulae (1) and (2) below be fulfilled:

$$0.3 < L2/L1 < 1 \tag{1}$$

$$0.2 < |f1/f2| < 1 \tag{2}$$

where, when a principal ray that is emitted from the image center on the display device surface and reaches the image center on the screen surface is called a central principal ray, L1 represents a distance that is in the normal direction of the display device surface and extends from the image center on the display device surface from which the central principal ray is emitted to a point where the central principal ray hits the concave reflection surface;

L2 represents a distance that is in the normal direction of the screen surface and extends from a point where the central principal ray hits the concave reflection surface to a point where the central principal ray hits the convex reflection surface;

f1 represents a focal length of the concave reflection surface at the point where the central principal ray hits the concave reflection surface; and f2 represents a focal length of the convex reflection surface at the point where the central principal ray hits the convex reflection surface.

In an optical system, when it is assumed that an optical power is $\phi$ and a refraction index is n, the Petzval sum is represented as $P=\Sigma(\phi/n)$. To make curvature of field small, it is preferable to make a positive optical power small and to make a negative optical power large. Thus, curvature of field can be made small. The resultant optical power $\phi$ of an optical system (distance d) having two optical powers $\phi 1$ and $\phi 2$ is represented as $\phi=\phi 1+\phi 2-d\phi 1\phi 2$. The shorter the distance d between the positive optical powers is, and the longer the distance d between the positive optical power and the negative optical power is, the smaller the individual optical powers, especially the positive optical power can be made. Accordingly, the longer the distance between the concave reflection surface and the convex reflection surface is made, and the shorter the distance between the refraction optical portion and the concave reflection surface is made, the smaller the positive optical power can be made relatively. In addition, if the negative optical power on the enlargement side is made large, the effective diameter can be made small, thereby the mirror size can be reduced. As described above, if the conditional formulae (1) and (2) are fulfilled, aberration unique to the wide-angle oblique projection optical system can be efficiently corrected, and size reduction of the optical parts can also be achieved.

If the lower limit of conditional formula (1) is disregarded, the optical power of the concave reflection surface becomes large, and the aberration correction (e.g., correction of curvature of field) becomes difficult to carry out. Because a shift amount needs to be increased to avoid interference of the mirror and lens holders with the optical path, it becomes all the more difficult to carry out the aberration correction. If the upper limit of conditional formula (1) is disregarded, the convex mirror becomes large in size.

It is preferable that a conditional formula (1a) below be fulfilled, and it is further preferable that a conditional formula (1b) be fulfilled:

$$0.4 < L2/L1 < 0.9 \tag{1a}$$

$$0.5 < L2/L1 < 0.8 \tag{1b}$$

These conditional formulae (1a) and (1b) define, of the conditional range defined by the above conditional formula (1), more preferable conditional ranges based on the viewpoints described above and the like. By fulfilling preferably the conditional formula (1a) and by fulfilling further preferably the conditional formula (1b), aberration unique to the wide-angle oblique projection optical system can be more efficiently corrected, and further size reduction of the optical parts can also be achieved.

If the lower limit of conditional formula (2) is disregarded, the optical power of the convex reflection surface becomes weak, which leads to a large size of the convex reflection surface. Or the optical power of the concave reflection surface becomes strong, which becomes disadvantageous to correction of curvature of field. If the upper limit of conditional formula (2) is disregarded, the optical power of the convex reflection surface becomes too strong, and it becomes difficult to correct aberration such as curvature of field, distortion and the like. Or because the optical power of the concave reflection surface becomes weak and the distance L2 tends to become long, the concave reflection surface becomes large in size.

It is preferable that a conditional formula (2a) below be fulfilled, and it is further preferable that a conditional formula (2b) be fulfilled:

$$0.3 < |f1/f2| < 0.8 \tag{2a}$$

$$0.3 < |f1/f2| < 0.6 \tag{2b}$$

These conditional formulae (2a) and (2b) define, of the conditional range defined by the above conditional formula (2), more preferable conditional ranges based on the viewpoints described above and the like. By fulfilling preferably the conditional formula (2a) and by fulfilling further preferably the conditional formula (2b), aberration unique to the wide-angle oblique projection optical system can be more efficiently corrected, and further size reduction of the optical parts can also be achieved.

In a case where the concave reflection surface and the convex reflection surface are each composed of a free curved surface (e.g., the oblique projection optical system PO of the type 1), or in a case where the concave reflection surface and the convex reflection surface are each composed of a rotationally symmetric aspherical surface (e.g, the oblique projection optical system PO of the type 2), the focal length of the reflection surface changes from point to point, that is, from the point where the central principal ray hits the reflection surface to the other points. Here, the focal length f1 of the concave reflection surface at a point where the central principal ray hits the concave reflection surface and the focal length f2 of the convex reflection surface at a point where the central principal ray hits the convex reflection surface are explained below.

Figure 7:
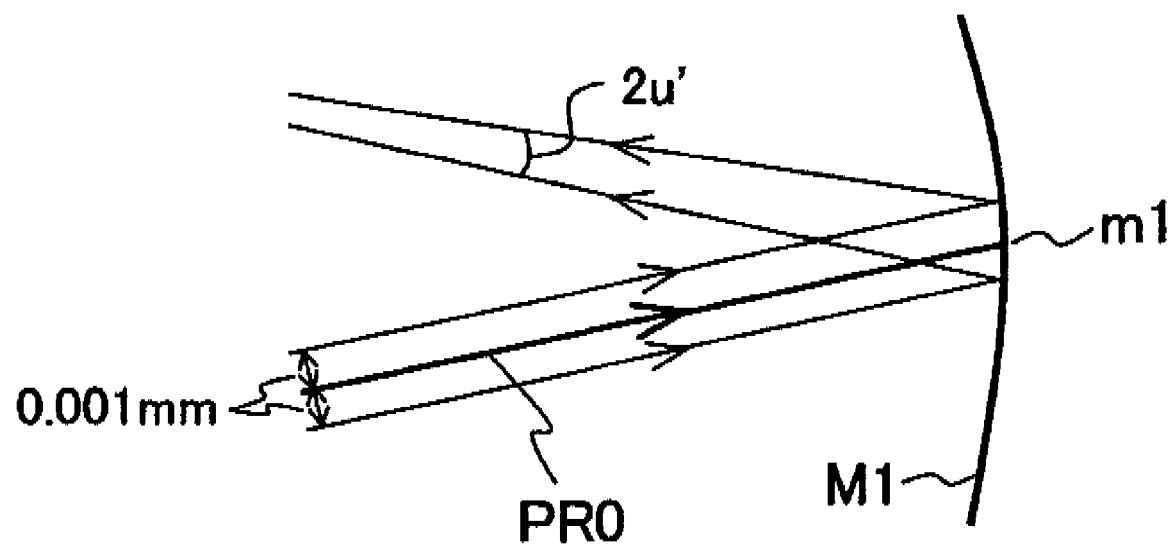
FIG. 7 is a schematic diagram to explain focal lengths f1 and f2.

For example, as shown in FIG. 7, in a case where the central principal ray PR0 hits the concave reflection surface of the mirror M1 in this paper plane, a plane, that is, a plane of incidence which contains the central principal ray PR0 and the normal at an incident point m1 where the central principal ray PR0 hits the concave reflection surface agrees with this paper plane. When it is assumed that the plane of incidence is a first plane, among the light rays that are parallel to the central principal ray PR0 and deviate by ±0.001 mm from the central principal ray PR0 in the direction perpendicular to the central principal ray PR0, there are two light rays that hit the concave reflection surface of the mirror M1 in the first plane. When it is assumed that a plane which is perpendicular to the first plane and contains the central principal ray PR0 is a second plane, there are also two light rays that hit the concave reflection surface of the mirror M1 in the second plane. When it is assumed that in one of the first and second planes, an angle between two light rays that are reflected by the concave reflection surface of the mirror M1 is 2u' (radian), the focal length of the concave reflection surface of the mirror M1 in the plane is defined by 0.001/u'. The average value of the focal length of the concave reflection surface of the mirror M1 in the first plane and the focal length of the concave reflection surface of the mirror M1 in the second plane is defined as the focal length f1 at the point m1 of the concave reflection surface of the mirror M1 where the central principal ray PR0 hits the concave reflection surface of the mirror M1.

The focal length f2 of the convex reflection surface at a point where the central principal ray hits the convex reflection surface can also be defined as the focal length f1. Accordingly, when it is assumed that a plane which contains the central principal ray and the normal at an incident point where the central principal ray hits the concave reflection surface or the convex reflection surface is a first plane; a plane which is perpendicular to the first plane and contains the central principal ray PR0 is a second plane; and in one of the first and second planes, an angle between two light rays that are parallel to the central principal ray, deviate by ±0.001 mm from the central principal ray in the direction perpendicular to the central principal ray PR0, and are reflected by the concave reflection surface or by the convex reflection surface is 2u' (radian), the focal length of the concave reflection surface or the convex reflection surface in the plane is defined by 0.001/u'. And the average value AV1 of the focal length of the concave reflection surface in the first plane and the focal length of the concave reflection surface in the second plane, and the average value AV2 of the focal length of the convex reflection surface in the first plane and the focal length of the convex reflection surface in the second plane are defined as the focal lengths f1 and f2, respectively. Focal lengths f1a and f1b described later are defined in the same way as these focal lengths f1 and f2.

It is preferable that conditional formula (3) below be fulfilled:

$$0.2 < f0/f1 < 1 \quad (3),$$

where
f0 represents a paraxial focal length of the rotationally symmetric coaxial refraction group.

If the conditional formula (3) is fulfilled, it is possible to prevent a positive optical power from concentrating on only one concave reflection surface. Accordingly, the optical power balance between the refraction optical portion and the reflection optical portion can be optimized, and it becomes possible to carry out well-balanced aberration correction of the entire oblique projection optical system. If the lower limit of conditional formula (3) is disregarded, the optical power of the rotationally symmetric coaxial refraction group becomes considerably strong. Consequently, a large number of lenses are required for aberration correction (e.g., corrections of distortion, curvature of field, chromatic aberration and the like), and the total length of the rotationally symmetric coaxial refraction group becomes long, thereby it becomes disadvantageous in terms of size, weight, cost and the like. If the upper limit of conditional formula (3) is disregarded, the optical power of the rotationally symmetric coaxial refraction group becomes considerably weak. Consequently, the distance from the display device surface to the concave reflection surface becomes long, thereby it becomes disadvantageous in terms of size, weight, cost and the like. Besides, because the burden of the positive optical power on the concave reflection surface increases, the balance of aberration correction becomes bad.

It is preferable that a conditional formula (3a) below be fulfilled, and it is further preferable that a conditional formula (3b) be fulfilled:

$$0.3 < f0/f1 < 0.9 \quad (3a),$$

$$0.5 < f0/f1 < 0.9 \quad (3b).$$

These conditional formulae (3a) and (3b) define, of the conditional range defined by the above conditional formula (3), more preferable conditional ranges based on the viewpoints described above and the like. By fulfilling preferably the conditional formula (3a) and by fulfilling further preferably the conditional formula (3b), the optical power balance between the refraction optical portion and the reflection optical portion can be further optimized, and it becomes possible to carry out better-balanced aberration correction of the entire oblique projection optical system.

It is preferable that conditional formula (4) below be fulfilled:

$$0.5 < p/L1 < 0.9 \quad (4),$$

where, in a plane (i.e., a plane of incidence of the central principal ray) that contains the central principal ray immediately before it hits the screen surface, and the normal of the screen surface at the image center on the screen surface, p1 is a point where a tracing-back ray of a principal ray, which is a ray of a light beam hitting the screen surface at the largest incident angle and hits the concave reflection surface, meets with a tracing-back ray of a principal ray which is a ray of a light beam hitting the screen surface at the smallest incident angle and hits the concave reflection surface, and p2 is the mid-point between a point where a principal ray, which is a ray of a light beam hitting the screen surface at the largest incident angle, hits the concave reflection surface, and a point where a principal ray, which is a ray of a light beam hitting the screen surface at the smallest incident angle, hits the concave reflection surface, wherein p is the distance which extends from the point p1 to the point p2 and is in the normal direction of the display device surface.

Figure 8:
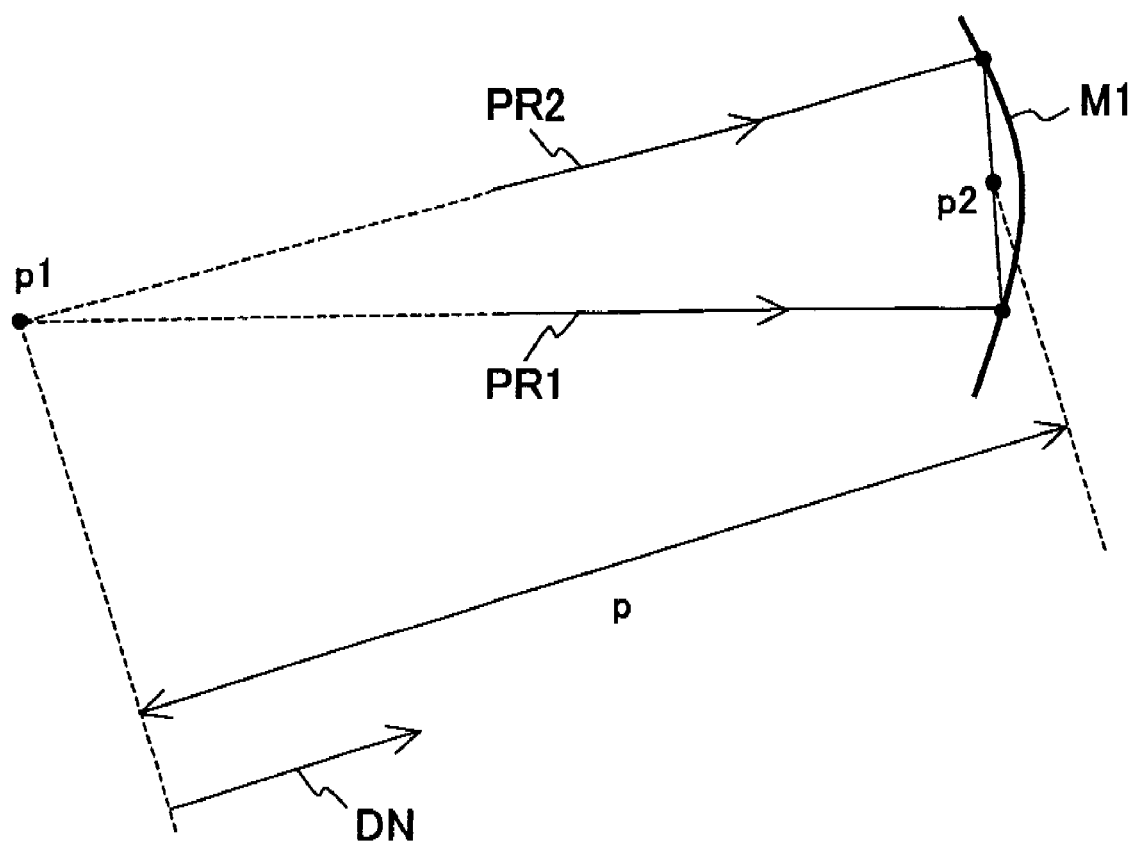
FIG. 8 is a schematic diagram to explain a distance p.

FIG. 8 shows the distance p that extends from the point p1 and to the point p2 in the normal direction DN of the display device surface So. In a plane (i.e., a plane of incidence of the central principal ray PR0) that contains the central principal ray PR0 (FIGS. 1 and 3) immediately before it hits the screen surface Si (FIGS. 1 and 3), and the normal of the screen surface Si at the image center on the screen surface Si, the point p1 is a point where a tracing-back ray of the principal ray PR1, which is the principal ray of a light beam hitting the screen surface Si at the largest incident angle and hits the concave reflection surface of the mirror M1, meets with a tracing-back ray of the principal ray PR2 which is the principal ray of a light beam hitting the screen surface Si at the smallest incident angle and hits the concave reflection surface of the mirror M1. The point p2 is the mid-point between a point where the principal ray PR1, which is the principal ray of a light beam hitting the screen surface Si at the largest incident angle, hits the concave reflection surface of the mirror M1, and a point where the principal ray PR2, which is the principal ray of a light beam hitting the screen surface Si at the smallest incident angle, hits the concave reflection surface of the mirror M1.

The conditional formula (4) defines the position of an exit pupil on the intermediate-image side to the size of the entire optical system, and is also related to the optical power arrangement of each of the refraction optical portion, the concave reflection surface, and the convex reflection surface. If the conditional formula (4) is fulfilled, not only the optical power balance between the refraction optical portion and the reflection optical portion in carrying out aberration correction becomes optimum and efficient aberration correction can be carried out but also it becomes possible to compact the entire oblique projection optical system. If the lower limit of conditional formula (4) is disregarded, it is necessary to lengthen the total length of the refraction optical portion and to strengthen the optical power of the refraction optical portion. Consequently, a large number of lenses are required for aberration correction (e.g., corrections of distortion, curvature of field, chromatic aberration and the like), and it becomes disadvantageous in terms of size, weight, cost and the like. If the upper limit of conditional formula (4) is disregarded, because the optical system becomes substantially a telecentric system toward the intermediate image side, the effective diameter of the enlargement-side lens becomes large, which leads to a large size of the oblique projection optical system. If an approach to cutout of an unused region is used to avoid the disadvantage, it becomes time-consuming and cots high.

It is preferable that a conditional formula (4a) below be fulfilled, and it is further preferable that a conditional formula (4b) be fulfilled:

$$0.55 < p/L1 < 0.85 \quad (4a),$$

$$0.6 < p/L1 < 0.8 \quad (4b).$$

These conditional formulae (4a) and (4b) define, of the conditional range defined by the above conditional formula (4), more preferable conditional ranges based on the viewpoints described above and the like. By fulfilling preferably the conditional formula (4a) and by fulfilling further preferably the conditional formula (4b), not only the optical power balance between the refraction optical portion and the reflection optical portion in carrying out aberration correction is further optimized and more efficient aberration correction can be carried out but also it becomes possible to further compact the entire oblique projection optical system.

It is preferable that a lens element disposed at a most enlargement-side end of the refraction optical portion fulfills conditional formula (5) below:

$$0.2 < L3/L2 < 1.5 \quad (5),$$

where
L3 represents a distance which is in the normal direction of the display device surface and extends from a point where the central principal ray hits the concave reflection surface to a point where the central principal ray hits a refraction surface on the enlargement side of the lens element disposed at the most enlargement-side end of the refraction optical portion.

The conditional formula (5) shows that when the entire optical system is divided into a refraction optical portion and a reflection optical portion, how close the refraction optical portion or part of it is relatively located to the reflection optical portion. Because there are only two curved reflection surfaces that are present after the intermediate image, if the lens element disposed at a most enlargement-side end of the refraction optical portion fulfills conditional formula (5), the burden of aberration correction on the reflection surfaces that are present after the intermediate image can be reduced, thereby reductions in error sensitivity and size of the mirror can be effectively carried out. If the lower limit of conditional formula (5) is disregarded, it becomes hard to avoid interference of the lens and its holder with the light ray reflected by the concave reflection surface. To avoid the interference, it is necessary to make the reflection angle at the concave reflection surface tight (i.e., large), which leads to increase in size under the screen surface. If the upper limit of conditional formula (5) is disregarded, only the reflection surfaces bear substantially all of the burden of aberration correction after the intermediate image, which leads to increase in error sensitivity and to a large size of the mirror.

It is preferable that a conditional formula (5a) below be fulfilled, and it is further preferable that a conditional formula (5b) be fulfilled:

$$0.3 < L3/L2 < 1.2 \quad (5a),$$

$$0.4 < L3/L2 < 0.8 \quad (5b).$$

These conditional formulae (5a) and (5b) define, of the conditional range defined by the above conditional formula (5), more preferable conditional ranges based on the viewpoints described above and the like. By fulfilling preferably the conditional formula (5a) and by fulfilling further preferably the conditional formula (5b), the burden of aberration correction that is present after the intermediate image and is borne by the reflection surfaces can be further reduced, thereby reductions in error sensitivity and size of the mirror can be more effectively carried out.

In an oblique projection optical system that includes a transmission refraction block which includes part of the refraction optical portion, and a reflection refraction block which includes part of the refraction optical portion, the concave reflection surface and the convex reflection surface, it is preferable that a lens is disposed as a cover for the reflection refraction block, and the projection light enters inside the reflection refraction block via the cover. It is further preferable that the cover lens is the lens element disposed at a most enlargement-side end of the refraction optical portion and fulfills the conditional formula (5). If a lens element that fulfills the conditional formula (5) is disposed as the cover for the reflection refraction block, because it becomes unnecessary to dispose an additional member for dust blocking, it becomes possible to achieve a size reduction of the oblique projection optical system and to reduce the number of parts.

It is preferable that the refraction optical portion has a rotationally asymmetric aspherical surface on the enlargement side of the coaxial refraction group, the aspherical surface does not share the optical axis with the rotationally symmetric coaxial refraction group, and is tilted in the same direction as that of the surface of the intermediate image. According to such a construction, it is possible to substantially equalize on-the-lens unevenness of the light beams that are respectively emitted from each image height. Thus, the effects of aberration correction (i.e., corrections of coma aberration, spherical aberration and the like) can be equalized for each image height, and aberration to be corrected does not change depending on the image heights. Accordingly, equal aberration correction can be carried out for any image height. In the oblique projection optical system OP of the type 1 (FIG. 2), a free curved surface lens G8F has a rotationally asymmetric aspherical surface (i.e., a free curved surface) that does not share the optical axis with the rotationally symmetric coaxial refraction group GR, and that is tilted in the same direction as that of the intermediate-image surface Im, thereby equal aberration correction can be carried out for any image height. Besides, it is further preferable that the lens element disposed at a most enlargement-side end of the refraction optical portion that fulfills the conditional formula (5) has a rotationally asymmetric aspherical surface, the aspherical surface does not share the optical axis with the rotationally symmetric coaxial refraction group, and is tilted in the same direction as that of the surface of the intermediate image.

It is preferable to carry out focusing by moving only the concave reflection surface depending on change in the projection distance. Because the concave reflection surface is the curved reflection surface that is nearest to the intermediate image, back focus can be corrected with no unnecessary change in aberration by moving only the concave reflection surface. Because it is possible to fix the convex reflection surface that is disposed on the most enlargement side, it also becomes advantageous in terms of dust blocking.

It is preferable that conditional formula (6) below be fulfilled:

$$0.5 < f1a/f1b < 2.2 \tag{6},$$

where, in a plane (i.e., a plane of incidence of the central principal ray) that contains the central principal ray immediately before it hits the screen surface, and the normal of the screen surface at the image center on the screen surface,
 f1a represents the focal length of the concave reflection surface at a point where the principal ray of a light beam hitting the screen surface at the largest incident angle hits the concave reflection surface; and
 f1b represents the focal length of the concave reflection surface at a point where the principal ray of a light beam hitting the screen surface at the smallest incident angle hits the concave reflection surface.

If the projection distance changes in a wide-angle oblique projection optical system, curvature of field and astigmatism appear conspicuously. If the shape of the concave reflection surface that is moved at the time of focusing is so formed as to fulfill the conditional formula (6), curvature of field and astigmatism can be suitably corrected even at different projection distances. If a lower limit or an upper limit of the conditional formula (6) is disregarded, it becomes impossible to correct curvature of field and astigmatism.

It is preferable that a conditional formula (6a) below be fulfilled, and it is further preferable that a conditional formula (6b) be fulfilled:

$$0.8 < f1a/f1b < 2 \tag{6a},$$

$$1.2 < f1a/f1b < 2 \tag{6b}.$$

These conditional formulae (6a) and (6b) define, of the conditional range defined by the above conditional formula (6), more preferable conditional ranges based on the viewpoints described above and the like. By fulfilling preferably the conditional formula (6a) and by fulfilling further preferably the conditional formula (6b), curvature of field and astigmatism can be more suitably corrected in focusing.

It is preferable that the direction (i.e., the focus movement direction) in which the concave refraction surface is moved is tilted to the normal direction of the display device surface and fulfills conditional formula (7) below:

$$10° < \theta < 70° \tag{7},$$

where
 θ represents an angle (acute angle) between the axis along which the concave reflection surface is moved and the normal of the display device surface.

Figure 9:
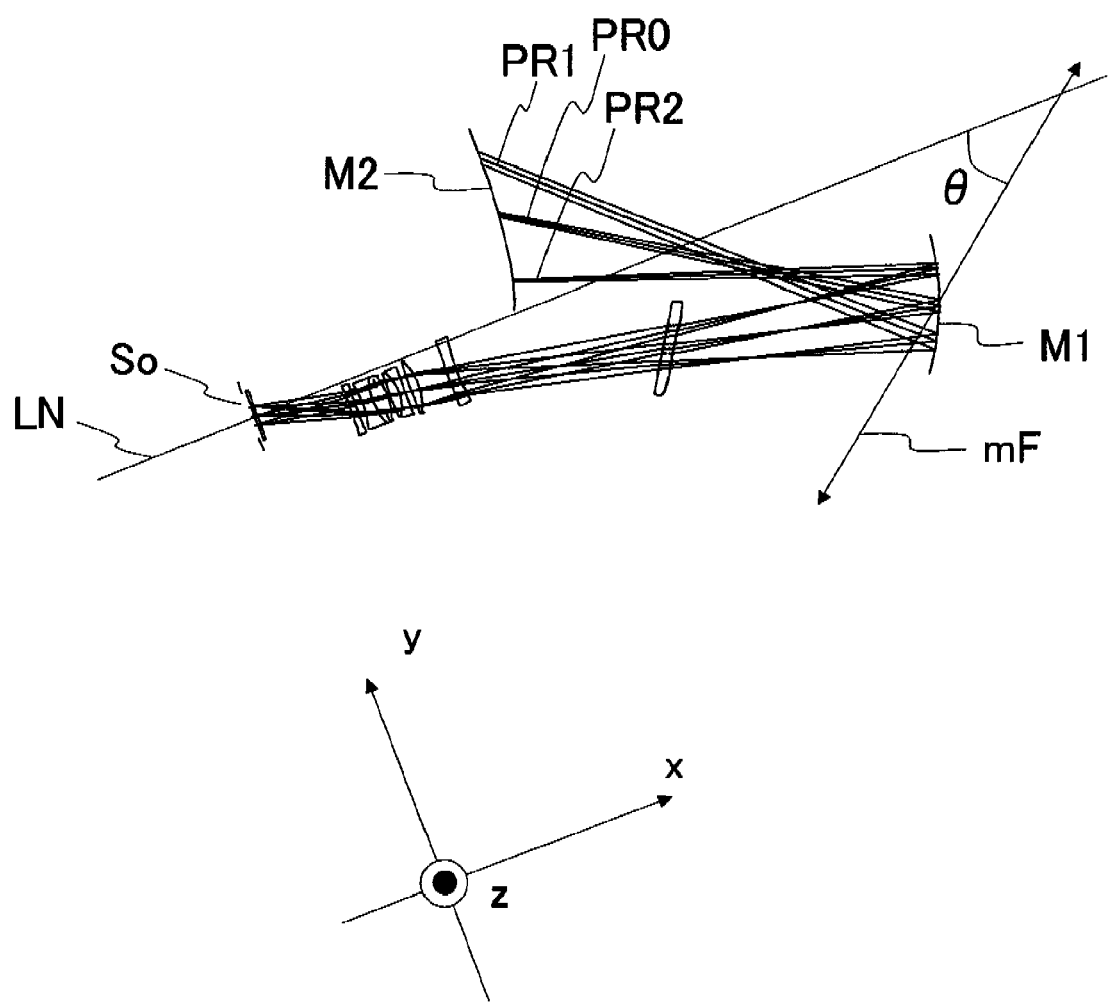
FIG. 9 is a schematic diagram to explain focusing by a concave mirror.

FIG. 9 shows an example of focusing in the oblique projection optical system PO (FIGS. 1 and 2) of the type 1. This focusing is carried out by moving the concave mirror M1 in an arrow mF direction In a rectangular coordinate system (x, y, z) that has the normal direction of the display device surface So as the x direction, the image-surface short-edge direction as the y direction, and the image-surface long-edge direction as the z direction, the angle θ between the axis (in other words, the focus movement direction mF) in which the concave mirror M1 is moved and the normal LN of the display device surface is positive in the positive direction of the z axis.

If the conditional formula (7) is fulfilled, besides suitable correction of back focus, at the same time, it is possible to make curvature of field and astigmatism at portions where the incident angles are loose (i.e., the incident angles are small) change small, and to make curvature of field and astigmatism at portions where the incident angles are tight (i.e., the incident angles are large) change largely. If a lower limit or an upper limit of the conditional formula (7) is disregarded, it becomes impossible to correct curvature of field and astigmatism.

It is preferable that a conditional formula (7a) below be fulfilled, and it is further preferable that a conditional formula (7b) be fulfilled:

$$20° < \theta < 60° \tag{7a},$$

$$30° < \theta < 50° \tag{7b}.$$

These conditional formulae (7a) and (7b) define, of the conditional range defined by the above conditional formula (7), more preferable conditional ranges based on the viewpoints described above and the like. By moving desirably the concave reflection surface for focusing to fulfill the conditional formula (7a) and by moving further preferably for focusing to fulfill the conditional formula (7b), back focus, curvature of field, and astigmatism can be better corrected.

In each embodiment described above, the following effects can be obtained by the distinctive constructions. For example, because the distance between the concave reflection surface and the convex reflection surface, and the optical power of the concave reflection surface and the convex reflection surface fulfill the conditional formulae (1) and (2), aberration correction and size can be well balanced with each other. Accordingly, it is possible to achieve an oblique projection optical system that allows super-wide angle projection keeping both high performance and compactness, and to achieve an image projection apparatus which uses the oblique projection optical system, has high performance and is compact.

Besides, in a construction in which the optical power of the refraction optical portion and the concave reflection surface fulfills the conditional formula (3), it is possible to prevent the positive optical power from concentrating on only one concave reflection surface, and to carry out well-balanced aberration correction of the entire oblique projection optical system. In a construction which fulfills the conditional formula (4), the optical power balance between the refraction system and the reflection system becomes well, and efficient aberration correction and further compactness of the entire oblique projection optical system become possible.

In a construction in which the lens element disposed at a most enlargement-side end of the refraction optical portion fulfills conditional formula (5), the burden of aberration correction on the reflection surface that is present after the intermediate image can be reduced, thereby it becomes possible to effectively carry out reductions in error sensitivity and in size of the mirror. If a lens that fulfills the conditional formula (5) is used, for example, as a cover of the reflection refraction block, because there is no need to dispose an additional member for dust blocking, it becomes possible to effectively reduce the oblique projection optical system in size and the number of parts. In addition, in a construction in which the oblique projection optical system has a rotationally asymmetric aspherical surface on the enlargement side of the coaxial refraction group, the aspherical surface does not share the optical axis with the coaxial refraction group, and is tilted in the same direction as that of the surface of the intermediate image, it is possible to equally apply aberration correction to any image height.

In a construction in which focusing is carried out by moving only the concave reflection surface depending on change in the projection distance, back focus can be corrected with no unnecessary change in aberration. Because the convex reflection surface can be fixed, it is also advantageous in terms of dust blocking. If focusing is carried out using the concave reflection surface that fulfills the conditional formula (6), curvature of field can be suitably corrected in carrying out the focusing. If the concave reflection surface is displaced for focus movement to fulfill the conditional formula (7), both the back focus and the curvature of field can be corrected well.

As seen from the above description, constructions of the following oblique projection optical system and image projection apparatus are included in the above embodiments of the respective types and in each example described later. According to the constructions, it is possible to well balance aberration correction and size with each other. Accordingly, it is possible to achieve an oblique projection optical system that allows super-wide angle projection keeping both high performance and compactness. If the oblique projection optical system is used in an image projection apparatus such as a rear projector, a front projector and the like, it can contribute to flatness, light weight, compactness, low cost, high performance, high function and the like of the image projection apparatus.

(T1): An oblique projection optical system that enlarges an image formed on a display device surface, obliquely projects the enlarged image on a screen surface, and has the following optical elements from the reduction side in the order of: a positive optical power refraction optical portion that includes a rotationally symmetric coaxial refraction group; a positive optical power concave reflection surface; and a negative optical power convex reflection surface. The oblique projection optical system fulfills the conditional formulae (1) and (2).

(T2): The oblique projection optical system described in the (T1), wherein an intermediate image of the image formed on the display device surface is formed between the refraction optical portion and the concave reflection surface, and an aperture stop image is formed between the concave reflection surface and the convex reflection surface.

(T3): The oblique projection optical system described in the (T1) or (T2), wherein at least one of the conditional formulae (1), (1a), and (1b) is fulfilled, and at least one of the conditional formulae (2), (2a), and (2b) is fulfilled.

(T4): The oblique projection optical system described in any one of the (T1) to (T3), wherein at least one of the conditional formulae (3), (3a), (3b), (4), (4a), and (4b) is fulfilled.

(T5): The oblique projection optical system described in any one of the (T1) to (T4), comprising at least one lens which fulfills at least one of the conditional formulae (5), (5a), and (5b).

(T6): The oblique projection optical system described in the (T5) that is composed of a transmission refraction block which includes part of the refraction optical portion, and a reflection refraction block which includes part of the refraction optical portion, the concave reflection surface and the convex reflection surface, wherein at least one of the lenses that fulfill the conditional formula (5) is disposed as a cover for the reflection refraction block, and projection light enters the reflection refraction block via the cover.

(T7): The oblique projection optical system described in the (T5) or (T6), wherein at least one of the lenses that fulfill the conditional formula (5) has a rotationally asymmetric aspherical surface, the aspherical surface does not share the optical axis with the coaxial refraction group, and is tilted in the same direction as that of the surface of the intermediate.

(T8): The oblique projection optical system described in any one of the (T1) to (T7), wherein focusing is carried out by moving only the concave reflection surface depending on change in the projection distance.

(T9): The oblique projection optical system described in the (T8), wherein at least one of the conditional formulae (6), (6a), and (6b) is fulfilled.

(T10): The oblique projection optical system described in the (T8) or (T9), wherein the direction in which the concave reflection surface is moved is tilted to the normal direction of the display device surface and fulfills the conditional formula (7).

(T11): An image display apparatus comprising the oblique projection optical system described in any one of the (T1) to (T10).

(U1): An image projection apparatus comprising a display device which forms a 2-dimensional image; and an oblique projection optical system which enlarges an image formed on the display device surface and projects the enlarged image on a screen surface, wherein the oblique projection optical system includes the following optical elements from the reduction side in the order of: a positive optical power refraction optical portion that includes a rotationally symmetric coaxial refraction group; a positive optical power concave reflection surface; and a negative optical power convex reflection surface, and fulfills the conditional formulae (1) and (2).

(U2): The image projection apparatus described in the (U1), wherein an intermediate image of the image formed on the display device surface is formed between the refraction optical portion and the concave reflection surface, and an aperture stop image is formed between the concave reflection surface and the convex reflection surface.

(U3): The image projection apparatus described in the (U1) or (U2), wherein at least one of the conditional formulae (1), (1a), and (1b) is fulfilled, and at least one of the conditional formulae (2), (2a), and (2b) is fulfilled.

(U4): The image projection apparatus described in any one of the (U1) to (U3), wherein at least one of the conditional formulae (3), (3a), (3b), (4), (4a), and (4b) is fulfilled.

(U5): The image projection apparatus described in any one of the (U1) to (U4), comprising includes at least one lens which fulfills at least one of the conditional formulae (5), (5a), and (5b).

(U6): The image projection apparatus described in the (U5) that is composed of a transmission refraction block which includes part of the refraction optical portion, and a reflection refraction block which includes part of the refraction optical portion, the concave reflection surface and the convex reflection surface, wherein at least one of the lenses that fulfill the conditional formula (5) is disposed as a cover for the reflection refraction block, and projection light enters the reflection refraction block via the cover.

(U7): The image projection apparatus described in the (U5) or (U6), wherein at least one of the lenses that fulfill the conditional formula (5) has a rotationally asymmetric aspherical surface, the aspherical surface does not share the optical axis with the coaxial refraction group, and is tilted in the same direction as that of the surface of the intermediate.

(U8): The image projection apparatus described in any one of the (U1) to (U7), wherein focusing is carried out by moving only the concave reflection surface depending on change in the projection distance.

(U9): The image projection apparatus described in the (U8), wherein at least one of the conditional formulae (6), (6a), and (6b) is fulfilled.

(U10): The image projection apparatus described in the (U8) or (U9), wherein the direction in which the concave reflection surface is moved is tilted to the normal direction of the display device surface and fulfills the conditional formula (7).

EXAMPLES

Hereinafter, an optical construction and the like of an oblique projection optical system that embodies the present invention will be further described in detail, with construction data and other data. Examples 1 and 2 presented below are numerical examples corresponding to the oblique projection optical systems PO of the Types 1 and 2, respectively, described hereinbefore, and therefore the optical configuration diagrams (FIGS. 1 to 4) of the oblique projection optical systems PO of the Types 1 and 2 show the corresponding optical arrangement, projection optical paths, etc. of Examples 1 and 2, respectively.

The construction data of each example show an optical arrangement of the system that includes from the display device surface So on the reduction side (which corresponds to an object surface in enlargement projection) to the screen surface Si on the enlargement side (which corresponds to an image surface in enlargement projection), and the n-th surface counted from the reduction side is Sn (n=1, 2, 3, ... ). Surfaces S1 and S2 in the example 1 are both surfaces of a cover glass CG that covers and protects the display device surface So, and do not form part of the oblique projection optical system PO.

The arrangement of each optical surface is, where its vertex is an origin (O) of a local orthogonal coordinate system (X, Y, Z), expressed by the origin (O) of the local orthogonal coordinate system (X, Y, Z) in a global orthogonal coordinate system (x, y, z) and coordinate data (x, y, z) of coordinate axes vector (VX, VY) of X-axis and Y-axis (in mm). Note that the coordinate systems are all defined by a right-handed system, and that the global orthogonal coordinate system (x, y, z) is an absolute coordinate system in agreement with a local orthogonal coordinate system (X, Y, Z) of the display device surface So. Therefore, an origin (o) in the global orthogonal coordinate system (x, y, z) is a point identical to an origin (O) located at the center of the display device surface So. The vector VX on the display device surface So is parallel to a surface normal line of the display device surface So. The vector VY is orthogonal to the vector VX and parallel to the image plane short side of the display device surface So. For the optical surfaces forming part of a coaxial optical system with an optical surface expressed by coordinate data (x, y, z) serving as a leading surface, their arrangement is expressed by axial distance T' (mm) in the X-direction with reference to an immediately preceding optical surface.

The surface shape of each optical element is expressed by a curvature C0 (mm$^{-1}$), a radius of curvature r (mm), etc. of its optical surface. For example, a surface Sn marked with symbol * is a rotationally symmetric aspherical surface, and its surface shape is expressed by formula (AS) below employing a local orthogonal coordinate system (X, Y, Z) where its surface vertex is an origin (O). A surface Sn marked with symbol $ is a rotationally asymmetric aspherical surface (so-called free curved surface) and its surface shape is expressed by formula (BS) below employing a local orthogonal coordinate system (X, Y, Z) where its surface vertex is an origin (O). Rotationally symmetric aspherical surface data and rotationally asymmetric aspherical surface data are indicated together with other data. It should be noted that any coefficient that is not shown equals 0 and that, for all the data, E−n=10$^{-n}$.

$$X = (C0 \cdot H^2)/(1+\sqrt{1-\epsilon \cdot C0^2 \cdot H^2}) + \Sigma\{A(i) \cdot H^i\} \quad \text{(AS)},$$

$$X = (C0 \cdot H^2)/(1+\sqrt{1-\epsilon \cdot C0^2 \cdot H^2}) + \Sigma\{G(j,k) \cdot Y^j \cdot Z^k\} \quad \text{(BS)},$$

where

X represents the displacement from a reference surface in the X-direction at a height H (relative to the vertex);

H represents a height in a direction perpendicular to the X-axis (H=$\sqrt{Y^2+Z^2}$);

C0 represents a curvature at the vertex (± is provided for the X-axis of the local orthogonal coordinate system. When it is positive, its curvature center is located in the positive direction on the vector VX; C0=1/r);

$\epsilon$ represents a quadric surface parameter;

A(i) represents a rotationally symmetric aspherical surface coefficient of the i-th order; and G(j, k) represents a rotationally asymmetric aspherical surface coefficient of the j-th order and k-th order for Y and Z, respectively.

Refractive index N for the d-line of a medium located on the incidence side of each optical surface, refractive index N' for the d-line of a medium located on the exit side of each optical surface (the value is negative when this optical surface is a reflection surface), and Abbe's number vd of an optical material are indicated together with other data. For aperture stops, virtual aperture stop data (including effective radius R) is similarly indicated with other optical surface data. A beam passing through an optical system defined by the construction data is defined as a beam exiting from the display device surface So and passing through the edge of the virtual circular aperture stop. Note that, in actual use, the aperture stop is installed near a position where a principal ray is condensed. Table 1 shows the values corresponding to the conditional formulae and the data related thereto as actually observed in each example. Values corresponding to the conditional formula (5) are the data that relate to the lenses G8 and G8F.

In each example, the image projection apparatus is composed of the display device DS, the projection optical system PO, and the screen SC. The projection optical system PO is composed of a plurality of optical elements that are located between the display device DS and the screen SC. In Example 1, the refraction optical portion LG that is composed of the rotationally symmetric coaxial refraction group GR (which is composed of the lenses G1 to G6) and the free-curved surface lenses G7F and G8F, the concave-mirror M1, and the convex-mirror M2 are the basic optical elements. In Example 2, the refraction optical portion LG (which is composed of only the rotationally symmetric coaxial refraction group GR) that is composed of the lenses G1 to G8, the concave mirror M1, and the convex mirror M2 are the basic optical elements.

In the example 1, the coaxial refraction group GR includes the following optical elements from the reduction side (the side of the display device surface So) in the order of: aspherical lens G1 whose reduction side surface is composed of a rotationally symmetric aspherical surface, a biconcave negative lens G2, a biconvex positive lens G3, a biconvex positive lens G4, a biconcave negative lens G5, and a biconvex positive lens G6. The enlargement-side surfaces of the free-curved surface lenses G7F and G8F are each formed of a free-curved surface. The concave mirror M1 has a concave reflection surface of a free-curved surface shape, and the convex mirror M2 has a convex reflection surface of a free curved surface shape.

In the example 2, the coaxial refraction group GR includes the following optical elements from the reduction side (the side of the display device surface So) in the order of: a positive optical power aspherical lens G1 whose both surfaces are each composed of a rotationally symmetric aspherical surface, a biconcave negative lens G2, a biconcave negative lens G3, a biconvex positive lens G4, a positive meniscus lens G5 that is convex toward the enlargement side, and a biconvex positive lens G6, a biconcave negative lens G7 whose reduction side surface is composed of a rotationally symmetric aspherical surface, and a negative meniscus-shape aspherical surface lens G8 whose both surfaces are each composed of a rotationally symmetric aspherical surface. The concave mirror M1 has a concave reflection surface of a rotationally symmetric aspherical surface shape, and the convex mirror M2 has a convex reflection surface of a rotationally symmetric aspherical surface shape.

Image plane sizes (in mm) of the display device surface So of Examples 1 are LY=±2.9187 and LZ=±5.1867. Image plane sizes (in mm) of the display device surface So of Examples 2 are LY=±4.1545 and LZ=±5.5393. The image plane shape of the display device surface So is rectangular, LY is a length in a direction (that is, Y-direction) of the image plane short side of the display device surface So, and LZ is a length in a direction (that is, Z-direction) of the image plane long side of the display device surface So. Detailed examples of the display device DS include: a digital micromirror device and an LCD (liquid crystal display).

The magnification $\beta$ and the f-numbers (FnoY, FnoZ) in each example are shown listed below. Here, FnoY represents the f-number in the vertical direction (Y-direction), and FnoZ represents the f-number in the horizontal direction (Z-direction).

Example 1: $\beta$=125.3, FnoY=4.77, FnoZ=4.64

Example 2: $\beta$=109.6, FnoY=3.00, FnoZ=2.97

Figure 5:
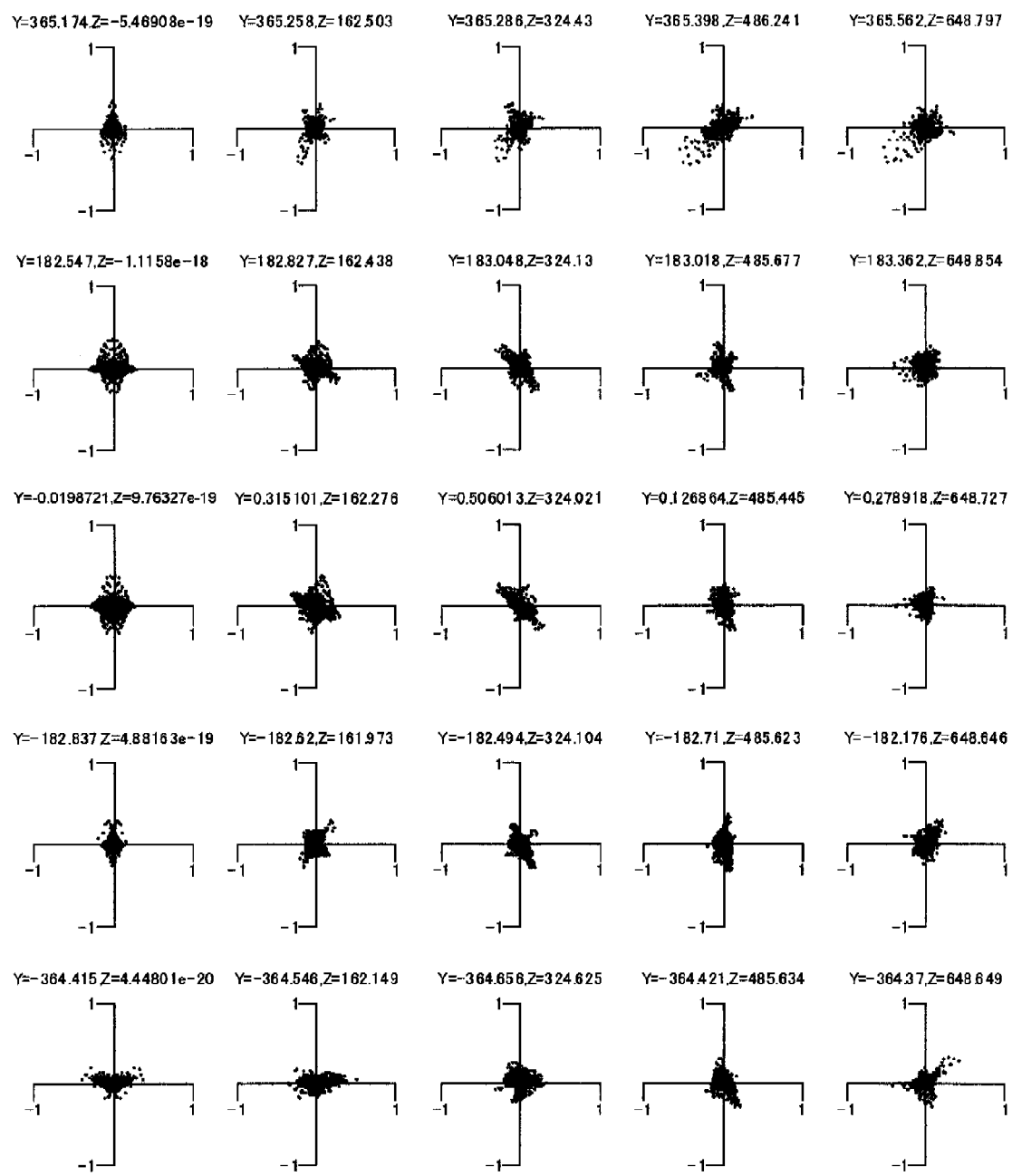
FIG. 5 is a spot diagram of Example 1 (the scale in ±1 mm)
Figure 6:
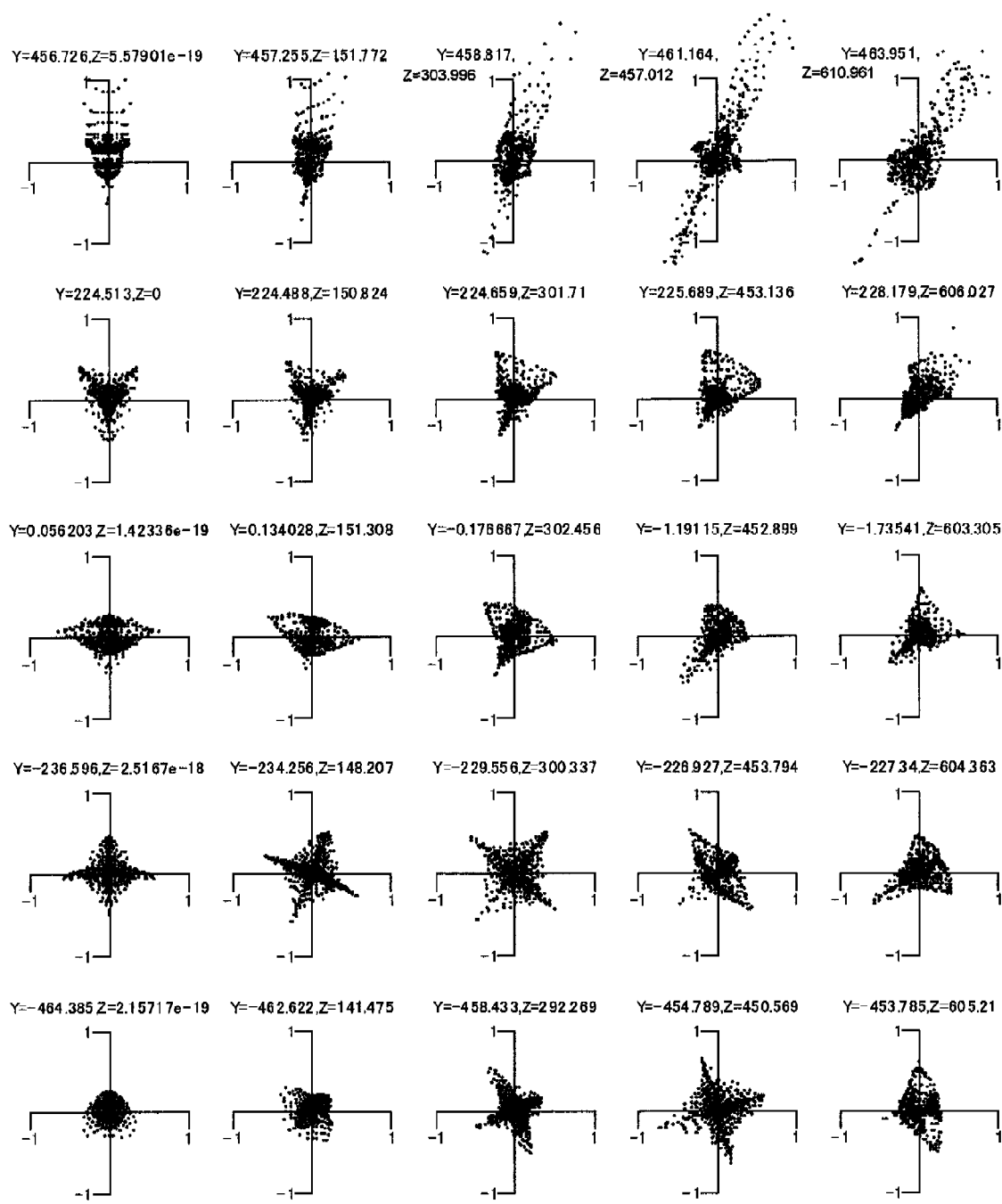
FIG. 6 is a spot diagram of Example 2 (the scale in ±1 mm)

Spot diagrams in the examples 1 and 2 are each shown in FIGS. 5 and 6. The spot diagrams show the imaging performance on the screen surface Si in terms of 3 wavelengths (460 nm, 546 nm, 620 nm) and 25 evaluation points. The scale in each spot diagram is ±1 mm. The coordinates (Y, Z) in FIGS. 5 and 6 are the local coordinates (Y, Z; mm; e-n=×10$^{-n}$) on the screen surface Si that shows a projection position of the spot centroid at each evaluation point. Because both examples are composed of a plane-symmetric optical system with respect to the XY plane, the spot diagrams show only the half on the plus side in the Z direction on the screen surface Si, and the remaining half is not shown. These evaluation points are conjugate with the divisional points that are obtained by equally dividing longitudinally and transversely the half of the display device surface So in the Z direction into 4 parts. An ideal image formation point on the spot diagram is given by a value that is obtained by multiplying the local coordinates Y, Z values of a point on the display device surface So by a magnification. And a deviation from the calculated value is a distortion.

Construction Data of Example 1

So (Display Device Surface)
Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000
N'=1.00000
T=1.11
S1 (Entrance Side Surface of Cover Glass CG)
N=1.00000
C0=0.00000000
N'=1.51161, vd=64.84
T=1.05
S2 (Exit Side Surface of Cover Glass CG)
N=1.51161, vd=64.84
C0=0.00000000
N'=1.00000
S3* (Entrance Side Surface of Lens G1)
Coordinates:
O: 30.00000, −9.31895, 0.00000
VX: 1.00000000, 0.00000000, 0.00000000
VY: 0.00000000, 1.00000000, 0.00000000
N=1.00000
C0=0.00000000
Aspherical Surface Data:
$\epsilon$=1.00000000
A(4)=−3.97900468E-5
A(6)=−1.85087500E-7
A(8)=4.69893183E-9
A(10)=−1.04646183E-10
A(12)=8.77605620E-13
N'=1.59232, vd=61.25
T=2
S4 (Exit Side Surface of Lens G1)
N=1.59232, vd=61.25
C0=0.00000000
N'=1.00000
T=2.23738
S5 (Entrance Side Surface of Lens G2)
N=1.00000
C0=−0.02528362(r=−39.5513)
N'=1.72475, vd=50.34
T=3

S6 (Exit Side Surface of Lens G2)
N=1.72475, vd=50.34
C0=0.04872448(r=20.5236)
N'=1.55388, vd=47.00
r=0.01
S7 (Entrance Side Surface of Lens G3)
N=1.55388, vd=47.00
C0=0.04872448(r=20.5236)
N'=1.62124, vd=63.33
T=5.32174
S8 (Exit Side Surface of Lens G3)
N=1.62124, vd=63.33
C0=−0.04618922(r=−21.6501)
N'=1.00000
T=0.5
S9 (Entrance Side Surface of Lens G4)
N=1.00000
C0=0.01309982(r=76.3369)
N'=1.62124, vd=63.33
T=3.19836
S10 (Exit Side Surface of Lens G4)
N=1.62124, vd=63.33
C0=−0.07188847(r=−13.9104)
N'=1.55388, vd=47.00
T=−0.01
S11 (Entrance Side Surface of Lens G5)
N=1.55388, vd=47.00
C0=−0.07188847(r=−13.9104)
N'=1.72475, vd=50.34
r=1.5
S12 (Exit Side Surface of Lens G5)
N=1.72475, vd=50.34
C0=0.00477862(r=209.2654)
N'=1.00000
T=1.93771
S13 (Entrance Side Surface of Lens G6)
N=1.00000
C0=0.00672419(r=148.7168)
N'=1.49902, vd=81.61
T=3.20241
S14 (Exit Side Surface of Lens G6)
N=1.49902, vd=81.61
C0=−0.05272466(r=−18.9665)
N'=1.00000
T=9.0824
S15 (Entrance Side Surface of Lens G7F)
N=1.00000
C0=0.00000000
N'=1.49553, vd=57.49
T=3
S16$ (Exit Side Surface of Lens G7F)
N=1.49553, vd=57.49
C0=0.00000000
Aspherical Surface Data:
ε=1.00000000
G(2, 0)=0.00790491953
G(3, 0)=1.71581201E-5
G(4, 0)=7.06471237E-6
G(5, 0)=1.22459091E-7
G(6, 0)=1.30806293E-8
G(7, 0)=−2.70078492E-9
G(8, 0)=−3.87665517E-10
G(9, 0)=−1.13653780E-11
G(10, 0)=3.29674242E-13
G(0, 2)=0.00756697906
G(1, 2)=2.07934573E-5
G(2, 2)=1.71057708E-5
G(4, 2)=1.11552937E-7
G(5, 2)=−1.69437905E-8
G(6, 2)=−5.21657438E-9
G(7, 2)=−5.22777196E-10
G(8, 2)=−2.08050522E-11
G(0, 4)=7.33784084E-6
G(1, 4)=−4.31214930E-7
G(2, 4)=−1.49752749E-7
G(3, 4)=−2.02344816E-8
G(4, 4)=−5.27294594E-11
G(5, 4)=4.14057721E-10
G(6, 4)=3.86912658E-11
G(0, 6)=6.52951848E-9
G(1, 6)=1.94108584E-8
G(2, 6)=4.47533689E-9
G(3, 6)=−1.47354409E-10
G(4, 6)=−3.79470644E-11
G(0, 8)=−1.64278048E-10
G(1, 8)=−2.66385487E-10
G(2, 8)=−5.64746555E-11
G(0,10)=3.79316070E-12
N'=1.00000
S17 (Entrance Side Surface of Lens G8F)
Coordinates:
O: 127.95109, −25.82097, 0.00000
VX: 0.85038895, −0.52615457, 0.00000000
VY: 0.52615457, 0.85038895, 0.00000000
N=1.00000
C0=0.00000000
N'=1.49553, vd=57.49
T'=3.11717
S18$ (Exit Side Surface of Lens G8F)
N=1.49553, vd=57.49
C0=0.00000000
Aspherical Surface Data:
ε=1.00000000
G(2, 0)=0.00145213176
G(3, 0)=−2.44576764E-5
G(4, 0)=−4.35846383E-6
G(5, 0)=3.32652901E-7
G(6, 0)=−6.62970197E-9
G(7, 0)=−5.78199770E-9
G(8, 0)=3.83633155E-10
G(9, 0)=3.51017139E-11
G(10, 0)=−2.99031928E-12
G(0, 2)=0.000979140752
G(1, 2)=−3.54661835E-5
G(2, 2)=−5.26226227E-6
G(3, 2)=7.79663144E-8
G(4, 2)=−5.08186685E-9
G(5,2)=−4.43975930E-10
G(6, 2)=−2.64215932E-11
G(7, 2)=1.03044591E-11
G(8, 2)=−1.05879734E-13
G(0, 4)=−6.18427965E-8
G(1, 4)=7.24278873E-8
G(2, 4)=3.51391929E-8
G(3, 4)=4.08702945E-9
G(4, 4)=8.27657843E-11
G(5, 4)=−3.00402738E-11
G(6, 4)=−8.16349819E-14
G(0, 6)=−4.96085174E-9
G(1, 6)=8.56345291E-10
G(2, 6)=−4.24438971E-10
G(3, 6)=−2.43716288E-11
G(4, 6)=1.59362398E-12
G(0, 8)=3.13981261E-11

G(1, 8)=−2.51946511E-12
G(2, 8)=1.45755626E-12
G(0,10)=−1.45933979E-13
N'=1.00000
S19$ (Concave Mirror M1)
Coordinates:
O: 216.24196, −33.06124, 0.00000
VX: 0.97346078, −0.22885390, 0.00000000
VY: 0.22885390, 0.97346078, 0.00000000
N=1.00000
C0=−0.01330757(r=−75.1452)
Aspherical Surface Data:
ϵ=−0.911446410
G(2, 0)=−0.000331158077
G(3, 0)=−1.43996861E-5
G(4, 0)=3.08895607E-9
G(5, 0)=2.74516222E-9
G(6, 0)=−5.65268871E-12
G(7, 0)=−3.77675242E-14
G(8, 0)=−6.17440789E-14
G(9, 0)=−3.12639409E-15
G(10, 0)=−3.78603686E-17
G(0, 2)=−0.000483922941
G(1, 2)=−1.54278305E-5
G(2,2)=1.80856153E-7
G(3, 2)=1.68772328E-8
G(4, 2)=−3.71849724E-11
G(5, 2)=−2.15845735E-11
G(6, 2)=−7.32985279E-13
G(7,2)=−1.03239352E-14
G(8,2)=−3.33051826E-17
G(0, 4)=−1.01268722E-7
G(1, 4)=−1.12618656E-8
G(2, 4)=−1.27541732E-9
G(3, 4)=−6.56287263E-11
G(4, 4)=−1.92775063E-12
G(5, 4)=−3.11284379E-14
G(6, 4)=−2.95375035E-16
G(0, 6)=7.10707348E-11
G(1, 6)=1.71144575E-11
G(2, 6)=1.26628123E-12
G(3, 6)=4.47042370E-14
G(4, 6)=7.82740057E-16
G(0, 8)=−2.62760487E-14
G(1, 8)=−7.05850999E-15
G(2,8)=−2.70126504E-16
G(0,10)=−1.79964469E-17
N'=−1.00000
S20$ (Convex Mirror M2)
Coordinates:
O: 89.37327, 3.76213, 0.00000
VX −0.93962974, 0.34219284, 0.00000000
VY: 0.34219284, 0.93962974, 0.00000000
N=1.00000
C0=0.00580395(r=172.2966)
Aspherical Surface Data:
G(2, 0)=0.00421744959
G(3, 0)=3.01382931E-5
G(4, 0)=−2.72735675E-6
G(5, 0)=7.02885762E-8
G(6, 0)=−1.07988799E-9
G(7, 0)=−7.61112608E-12
G(8, 0)=7.34085412E-13
G(9, 0)=−1.23261654E-14
G(10, 0)=6.89079026E-17
G(0, 2)=0.00375163895
G(1, 2)=1.72608982E-5

G(2, 2)=−1.60053072E-6
G(33, 2)=−4.84165151E-8
G(4, 2)=2.14890004E-9
G(5, 2)=−1.32432523E-13
G(36, 2)=−1.02063408E-12
G(37,2)=1.70936708E-14
G(8, 2)=−8.97101157E-17
G(0, 4)=−1.12710371E-6
G(1, 4)=−3.54996844E-9
G(2, 4)=1.11583331E-9
G(3, 4)=−9.12416039E-12
G(4, 4)=−4.45149581E-13
G(5, 4)=9.89712703E-15
G(6, 4)=−6.04363618E-17
G(0, 6)=3.99631793E-10
G(1, 6)=−2.58970012E-12
G(2, 6)=−2.28603140E-13
G(3, 6)=4.99289565E-15
G(4, 6)=−3.47169066E-17
G(0, 8)=−9.18214273E-14
G(1, 8)=8.74867099E-16
G(2, 8)=1.54906535E-18
G(0,10)=9.05133905E-18
N'=−1.00000
Si (Screen Surface)
Coordinates:
O: 631.86434, 278.68505, 0.00000
VX: 0.93487891, −0.35496680, 0.00000000
VY: 0.35496680, 0.93487891, 0.00000000
Virtual Aperture Stop Data:
Coordinates:
O: 40.00000, −9.97312, 0.00000
VX: 100000000, 0.00000000, 0.00000000
VY: 0.00000000, 1.00000000, 0.00000000
N=1.00000
C0=0.00000000, R=4.47214
N'=1.00000

Construction Data of Example 2

So (Display Device Surface)
Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000
N'=1.00000
S1* (Entrance Side Surface of Lens G1)
Coordinates:
O: 37.82710, −5.40000, 0.00000
VX: 1.00000000, 0.00000000, 0.00000000
VY: 0.00000000, 1.00000000, 0.00000000
N=1.00000
C0=0.03617024(r=27.6470)
Aspherical Surface Data:
ϵ=1.00000000
A(4)=−5.53244600E-8
A(6)=8.59833900E-9
A(8)=−1.32079000E-10
A(10)=1.07116700E-12
N'=1.80295, vd=23.48
T=14.7274
S2* (Exit Side Surface of Lens G1)
N=1.80295, vd=23.48
C0=−0.03416093(r=−29.2732)
Aspherical Surface Data:

ε=1.00000000
A(4)=1.44055400E-5
A(6)=1.59771900E-8
A(8)=−3.85003700E-10
A(10)=2.26355900E-12
N'=1.00000
T'=0.542593
S3 (Entrance Side Surface of Lens G2)
N=1.00000
C0=−0.02484859(r=−40.2437)
N'=1.84549, vd=28.46
T=2
S4 (Exit Side Surface of Lens G2)
N=1.84549, vd=28.46
C0=0.05666276(r=17.6483)
N'=1.67867, vd=54.55
T'=8.8
S5 (Entrance Side Surface of Lens G3)
N=1.67867, vd=54.55
C0=−0.08035436(r=−12.4449)
N'1.80135, vd=25.36
T=2
S6 (Exit Side Surface of Lens G3)
N=1.80135, vd=25.36
C0=0.02126636(r=47.0226)
N'=1.00000
T'=1.86375
S7 (Entrance Side Surface of Lens G4)
N=1.00000
C0=0.01030052(r=97.0825)
N'=1.49670, vd=69.11
T'=4.76835
S8 (Exit Side Surface of Lens G4)
N=1.49670, vd=69.11
C0=−0.02879885(r=−34.7236)
N'1.00000
T'=19.1086
S9 (Entrance Side Surface of Lens G5)
N=1.00000
C0=−0.00742199(r=−134.7347)
N'1.80810, vd=22.84
T'=7.33401
S10 (Exit Side Surface of Lens G5)
N=1.80810, vd=22.84
C0=−0.02593919(r=−38.5517)
N'=1.00000
T'=4.68728
S11 (Entrance Side Surface of Lens G6)
N=1.00000
C0=0.02637561(r=37.9138)
N'=1.49156, vd=69.84
T'=13.9981
S12 (Exit Side Surface of Lens G6)
N=1.49156, vd=69.84
C0=−0.00302316(r=−330.7797)
N'=1.00000
T'=4.88005
S13 (Entrance Side Surface of Lens G7)
N=1.00000
C0=−0.02407148(r=−41.5429)
N'=1.53050, vd=55.72
T'=10.6562
S14* (Exit Side Surface of Lens G7)
N=1.53050, vd=55.72
C0=0.03561260(r=28.0800)
Aspherical Surface Data:
ε=1.00000000
A(4)=2.86739100E-6
A(6)=−4.06745100E-8
A(8)=−5.6815900E-11
A(10)=−4.11411600E-14
N'=1.00000
T'=3.56182
S15* (Entrance Side Surface of Lens G8)
N=1.00000
C0=0.02438794(r=41.0039)
Aspherical Surface Data:
ε=1.00000000
A(4)=3.31038200E-5
A(6)=−1.27178100E-7
A(8)=2.63533800E-10
A(10)=−3.73681800E-13
N'=1.53050, vd=55.72
T'=2
S16* (Exit Side Surface of Lens G8)
N=1.53050, vd=55.72
C0=0.03847132(r=25.9934)
Aspherical Surface Data:
ε=1.00000000
A(4)=1.06004200E-5
A(6)=−9.47072400E-8
A(8)=2.29539900E-10
A(10)=−2.86039200E-13
N'=1.00000
S17* (Concave Mirror M1)
Coordinates:
O: 317.18275, −5.40000, 0.00000
VX: 1.00000000, 0.00000000, 0.00000000
VY: 0.00000000, 1.00000000, 0.00000000
N=1.00000
C0=−0.00916613(r=−109.0973)
Aspherical Surface Data:
ε=1.00000000
A(4)=1.42626400E-7
A(6)=7.96581000E-12
A(8)=−1.16804200E-15
A(10)=1.13786000E-19
N'=1.00000
S18* (Convex Mirror M2)
Coordinates:
O: 153.75525, −5.40000, 0.00000
VX: −1.00000000, 0.00000000, 0.00000000
VY: 0.00000000, 1.00000000, 0.00000000
N=1.00000
C0=0.00757429(r=132.0255)
Aspherical Surface Data:
ε=1.00000000
A(4)=−3.64456800E-7
A(6)=4.72089100E-12
A(8)=2.91380200E-15
A(10)=−2.47379100E-19
N=−1.00000
Si (Screen Surface)
Coordinates:
O: 513.75525, 584.42659, 0.00000
VX: 1.00000000, 0.00000000, 0.00000000
VY: 0.00000000, 1.00000000, 0.00000000
Virtual Aperture Stop Data:
Coordinates:
O: 37.82710, −5.40000, 0.00000
VX: 1.00000000, 0.00000000, 0.00000000
VY: 0.00000000, 1.00000000, 0.00000000
N=1.00000
C0=0.00000000, R=6.52828
N'=1.00000

TABLE 1

|  | L1 | L2 | L3 | f1 | f2 |
|---|---|---|---|---|---|
| Example 1 | 212.8 | 137.2 | 81.9 | 38.8 | −73.4 |
| Example 2 | 309.7 | 163.1 | 170.0 | 66.5 | −202.3 |

|  | f0 | p | f1a | f1b |
|---|---|---|---|---|
| Example 1 | 27.5 | 139.8 | 48.595 | 35.660 |
| Example 2 | 24.3 | 186.6 | 95.551 | 55.447 |

|  | Conditional Formula (1) L2/L1 | Conditional Formula (2) \|f1/f2\| | Conditional Formula (3) f0/f1 | Conditional Formula (4) p/L1 |
|---|---|---|---|---|
| Example 1 | 0.645 | 0.528 | 0.710 | 0.657 |
| Example 2 | 0.526 | 0.329 | 0.365 | 0.602 |

|  | Conditional Formula (5) L3/L2 | Conditional Formula (6) f1a/f1b | Conditional Formula (7) θ |
|---|---|---|---|
| Example 1 | 0.597 | 1.363 | 43.3 |
| Example 2 | 1.043 | 1.723 | — |

What is claimed is:

1. An oblique projection optical system that enlarges an image formed on a display device surface, and obliquely projects the enlarged image on a screen surface, the oblique projection optical system comprising, in the order from a reduction side:

a refraction optical portion having a positive optical power;
a concave reflection surface having a positive optical power; and
a convex reflection surface having a negative optical power, wherein
the refraction optical portion includes a rotationally symmetric coaxial refraction group,
an intermediate image of the image formed on the display device surface is formed between the refraction optical portion and the concave reflection surface,
an aperture stop image is formed between the concave reflection surface and the convex reflection surface,
and conditional formulae (1) and (2) below are fulfilled:

$$0.3 < L2/L1 < 1 \quad (1),$$

$$0.2 < |f1/f2| < 1 \quad (2),$$

where, when a principal ray that is emitted from the image center on the display device surface and reaches the image center on the screen surface is called a central principal ray,
L1 represents a distance that is in the normal direction of the display device surface and extends from the image center on the display device surface from which the central principal ray is emitted to a point where the central principal ray hits the concave reflection surface;
L2 represents a distance that is in the normal direction of the screen surface and extends from a point where the central principal ray hits the concave reflection surface to a point where the central principal ray hits the convex reflection surface;
f1 represents a focal length of the concave reflection surface at the point where the central principal ray hits the concave reflection surface; and
f2 represents a focal length of the convex reflection surface at the point where the central principal ray hits the convex reflection surface.

2. The oblique projection optical system according to claim 1,
wherein conditional formula (3) below is fulfilled:

$$0.2 < f0/f1 < 1 \quad (3),$$

where
f0 represents a paraxial focal length of the rotationally symmetric coaxial refraction group.

3. The oblique projection optical system according to claim 2,
wherein conditional formula (4) below is fulfilled:

$$0.5 < p/L1 < 0.9 \quad (4),$$

where, in a plane that contains the central principal ray immediately before it hits the screen surface, and the normal of the screen surface at the image center on the screen surface, p1 is a point where a tracing-back ray of a first principal ray, which is a principal ray of a light beam hitting the screen surface at the largest incident angle and hits the concave reflection surface, meets with a tracing-back ray of a second principal ray which is a principal ray of a light beam hitting the screen surface at the smallest incident angle and hits the concave reflection surface, and p2 is the mid-point between a point where the first principal ray, hits the concave reflection surface, and a point where the second principal ray, hits the concave reflection surface, wherein p is the distance which extends from the point p1 to the point p2 and is in the normal direction of the display device surface.

4. The oblique projection optical system according to claim 3,
wherein a lens element disposed at a most enlargement-side end of the refraction optical portion fulfills conditional formula (5) below:

$$0.2 < L3/L2 < 1.5 \quad (5),$$

where
L3 represents a distance which is in the normal direction of the display device surface and extends from a point where the central principal ray hits the concave reflection surface to a point where the central principal ray hits a refraction surface on the enlargement side of the lens element disposed at the most enlargement-side end of the refraction optical portion.

5. The oblique projection optical system according to claim 4,
wherein the oblique projection optical system has a rotationally asymmetric aspherical surface on the enlargement side of the coaxial refraction group, the aspherical surface does not share the optical axis with the coaxial refraction group, and is tilted in the same direction as that of the surface of the intermediate image.

6. The oblique projection optical system according to claim 2,
wherein focusing is carried out by moving only the concave reflection surface depending on change in the projection distance.

7. The oblique projection optical system according to claim 6,
wherein conditional formula (6) below is fulfilled:

$$0.5 < f1a/f1b < 2.2 \quad (6),$$

where, in a plane that contains the central principal ray immediately before it hits the screen surface, and the normal of the screen surface at the image center on the screen surface,
f1a represents the focal length of the concave reflection surface at a point where a principal ray of a light beam hitting the screen surface at the largest incident angle hits the concave reflection surface; and
f1b represents the focal length of the concave reflection surface at a point where a principal ray of a light beam hitting the screen surface at the smallest incident angle hits the concave reflection surface.

8. The oblique projection optical system according to claim 6,
wherein the direction in which the concave refraction surface is moved is tilted to the normal direction of the display device surface and fulfills conditional formula (7) below:

$$10° < \theta < 70° \quad (7),$$

where
θ represents an angle (acute angle) between the axis along which the concave reflection surface is moved and the normal of the display device surface.

9. The oblique projection optical system according to claim 1,
wherein conditional formula (4) below is fulfilled:

$$0.5 < p/L1 < 0.9 \quad (4),$$

where, in a plane that contains the central principal ray immediately before it hits the screen surface, and the normal of the screen surface at the image center on the screen surface, p1 is a point where a tracing-back ray of a first principal ray, which is a principal ray of a light beam hitting the screen surface at the largest incident angle and hits the concave reflection surface, meets with a tracing-back ray of a second principal ray which is a principal ray of a light beam hitting the screen surface at the smallest incident angle and hits the concave reflection surface, and p2 is the mid-point between a point where the first principal ray, hits the concave reflection surface, and a point where the second principal ray, hits the concave reflection surface, wherein p is the distance which extends from the point p1 to the point p2 and is in the normal direction of the display device surface.

10. The oblique projection optical system according to claim 9,
wherein a lens element disposed at a most enlargement-side end of the refraction optical portion fulfills conditional formula (5) below:

$$0.2 < L3/L2 < 1.5 \quad (5),$$

where
L3 represents a distance which is in the normal direction of the display device surface and extends from a point where the central principal ray hits the concave reflection surface to a point where the central principal ray hits a refraction surface on the enlargement side of the lens element disposed at the most enlargement-side end of the refraction optical portion.

11. The oblique projection optical system according to claim 10,
wherein the oblique projection optical system has a rotationally asymmetric aspherical surface on the enlargement side of the coaxial refraction group, the aspherical surface does not share the optical axis with the coaxial refraction group, and is tilted in the same direction as that of the surface of the intermediate image.

12. The oblique projection optical system according to claim 9,
wherein focusing is carried out by moving only the concave reflection surface depending on change in the projection distance.

13. The oblique projection optical system according to claim 12,
wherein conditional formula (6) below is fulfilled:

$$0.5 < f1a/f1b < 2.2 \quad (6),$$

where, in a plane that contains the central principal ray immediately before it hits the screen surface, and the normal of the screen surface at the image center on the screen surface,
f1a represents the focal length of the concave reflection surface at a point where the first principal ray of a light beam hitting the screen surface at the largest incident angle hits the concave reflection surface; and
f1b represents the focal length of the concave reflection surface at a point where the second principal ray of a light beam hitting the screen surface at the smallest incident angle hits the concave reflection surface.

14. The oblique projection optical system according to claim 12,
wherein the direction in which the concave refraction surface is moved is tilted to the normal direction of the display device surface and fulfills conditional formula (7) below:

$$10° < \theta < 70° \quad (7),$$

where
θ represents an angle (acute angle) between the axis along which the concave reflection surface is moved and the normal of the display device surface.

15. The oblique projection optical system according to claim 1,
wherein a lens element disposed at a most enlargement-side end of the refraction optical portion fulfills conditional formula (5) below:

$$0.2 < L3/L2 < 1.5 \quad (5),$$

where
L3 represents a distance which is in the normal direction of the display device surface and extends from a point where the central principal ray hits the concave reflection surface to a point where the central principal ray hits a refraction surface on the enlargement side of the lens element disposed at the most enlargement-side end of the refraction optical portion.

16. The oblique projection optical system according to claim 15,
wherein the oblique projection optical system has a rotationally asymmetric aspherical surface on the enlargement side of the coaxial refraction group, the aspherical surface does not share the optical axis with the coaxial refraction group, and is tilted in the same direction as that of the surface of the intermediate image.

17. The oblique projection optical system according to claim 1,
wherein focusing is carried out by moving only the concave reflection surface depending on change in the projection distance.

18. The oblique projection optical system according to claim 17,
wherein conditional formula (6) below is fulfilled:

$$0.5 < f1a/f1b < 2.2 \quad (6),$$

where, in a plane that contains the central principal ray immediately before it hits the screen surface, and the normal of the screen surface at the image center on the screen surface,
f1a represents the focal length of the concave reflection surface at a point where a principal ray of a light beam hitting the screen surface at the largest incident angle hits the concave reflection surface; and
f1b represents the focal length of the concave reflection surface at a point where a principal ray of a light beam hitting the screen surface at the smallest incident angle hits the concave reflection surface.

19. The oblique projection optical system according to claim 17, wherein the direction in which the concave refraction surface is moved is tilted to the normal direction of the display device surface and fulfills conditional formula (7) below:

$$10° < \theta < 70° \tag{7}$$

where
$\theta$ represents an angle (acute angle) between the axis along which the concave reflection surface is moved and the normal of the display device surface.

20. An image projection apparatus comprising:
a display device which forms a 2-dimensional image; and
an oblique projection optical system which enlarges the 2-dimensional image formed by the display device and projects the enlarged image on a screen surface, the oblique projection optical system includes, in the order from a reduction side:
a refraction optical portion having a positive optical power;
a concave reflection surface having a positive optical power; and
a convex reflection surface having a negative optical power, wherein
the refraction optical portion includes a rotationally symmetric coaxial refraction group,
an intermediate image of the 2-dimensional image is formed between the refraction optical portion and the concave reflection surface,
an aperture stop image is formed between the concave reflection surface and the convex reflection surface, and conditional formulae (1) and (2) below are fulfilled:

$$0.3 < L2/L1 < 1 \tag{1}$$

$$0.2 < |f1/f2| < 1 \tag{2}$$

where, when a principal ray that is emitted from the image center on the display device surface and reaches the image center on the screen surface is called a central principal ray,
L1 represents a distance that is in the normal direction of the display device surface and extends from the image center on the display device surface from which the central principal ray is emitted to a point where the central principal ray hits the concave reflection surface;
L2 represents a distance that is in the normal direction of the screen surface and extends from a point where the central principal ray hits the concave reflection surface to a point where the central principal ray hits the convex reflection surface;
f1 represents a focal length of the concave reflection surface at the point where the central principal ray hits the concave reflection surface; and
f2 represents a focal length of the convex reflection surface at the point where the central principal ray hits the convex reflection surface.

* * * * *